United States Patent
Miyashita et al.

(10) Patent No.: US 11,074,446 B2
(45) Date of Patent: Jul. 27, 2021

(54) INFORMATION PROCESSING APPARATUS, INFORMATION PROCESSING METHOD AND NON-TRANSITORY COMPUTER-READABLE STORAGE MEDIUM

(71) Applicant: Axelspace Corporation, Tokyo (JP)

(72) Inventors: Naoki Miyashita, Tokyo (JP); Yoshihiro Ota, Tokyo (JP); Ryota Kaneko, Tokyo (JP); James Alexander Hamilton, Tokyo (JP)

(73) Assignee: Axelspace Corporation, Tokyo (JP)

( * ) Notice: Subject to any disclaimer, the term of this patent is extended or adjusted under 35 U.S.C. 154(b) by 0 days.

(21) Appl. No.: 17/198,613

(22) Filed: Mar. 11, 2021

(65) Prior Publication Data
US 2021/0200983 A1 Jul. 1, 2021

Related U.S. Application Data

(63) Continuation of application No. PCT/JP2020/008732, filed on Mar. 2, 2020.

(30) Foreign Application Priority Data

Mar. 20, 2019 (JP) .............. JP2019-053501

(51) Int. Cl.
*G06K 9/00* (2006.01)
*G06T 11/60* (2006.01)
*G06K 9/46* (2006.01)

(52) U.S. Cl.
CPC ......... *G06K 9/0063* (2013.01); *G06K 9/4642* (2013.01); *G06T 11/60* (2013.01)

(58) Field of Classification Search
CPC ........... G06K 9/00463; G06K 9/00449; G06K 9/00456; G06K 9/00469; G06K 9/4671;
(Continued)

(56) References Cited

U.S. PATENT DOCUMENTS

2010/0226591 A1* 9/2010 Kameyama ............. G06T 7/215
382/283
2017/0269187 A1* 9/2017 Ikeda ..................... G06T 7/248

FOREIGN PATENT DOCUMENTS

JP 2009-146262 A 7/2009
JP 2012-38256 A 2/2012

OTHER PUBLICATIONS

English Translation of International Search Report for PCT Application No. PCT/JP2020/008732 dated May 19, 2020, 2 pages.

* cited by examiner

*Primary Examiner* — Duy M Dang
(74) *Attorney, Agent, or Firm* — Bret E. Field; Bozicevic, Field & Francis LLP

(57) ABSTRACT

An information processing apparatus comprising: one or more processing devices; and one or more storage devices storing instructions for causing the one or more processing devices to: store observation information obtained through observation of a target region on the earth from a flying object moving in outer space into the one or more storage devices; output to a terminal device a map image corresponding to the target region on which a dividing line for dividing the target region into a plurality of areas is superimposed; accept designation input for designating multiple ones of the plurality of areas divided by the dividing line from the terminal device; extract area observation information being a part of the observation information and corresponding to each of the multiple ones of the plurality of areas designated; and output to the terminal device the area observation information extracted.

8 Claims, 24 Drawing Sheets

(58) Field of Classification Search
CPC ............. G06K 9/6267; G06K 9/00281; G06K 9/00261; G06K 9/00288; G06K 9/52; G06K 9/6215; G06K 9/0063; G06K 9/4642; G06F 17/30268; G06T 7/20; G06T 11/60

See application file for complete search history.

FIG. 2
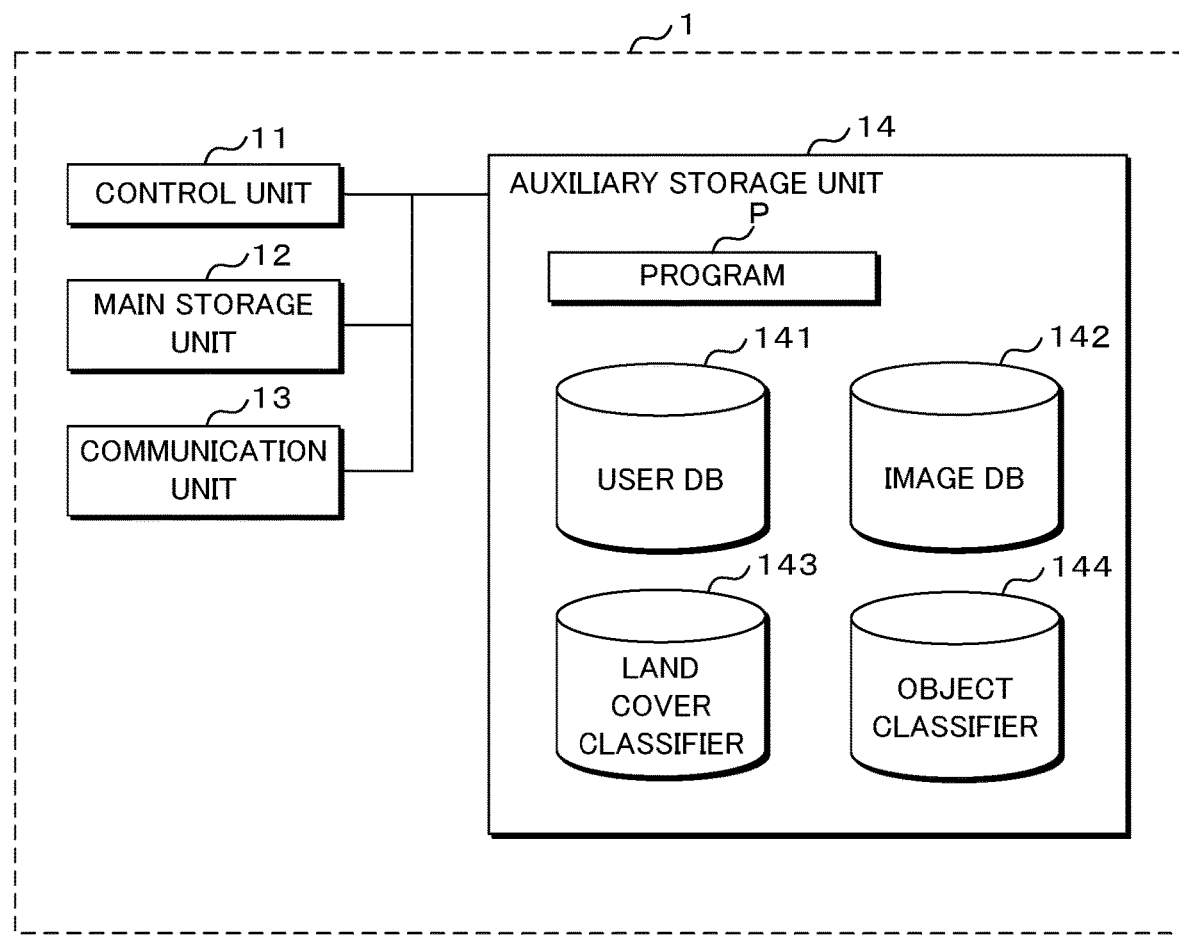
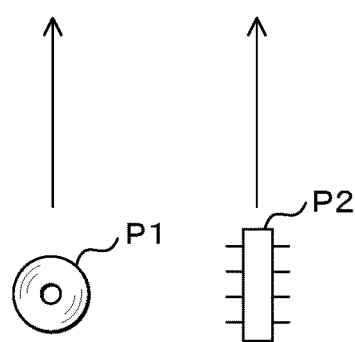

FIG. 3

| | | | 141 |
|---|---|---|---|
| USER ID | NAME | USER INFORMATION | PURCHASED IMAGE |
| 10001 | A | ... | ... |
| ... | ... | ... | ... |

| | | | | | | 142 | |
|---|---|---|---|---|---|---|---|
| IMAGE ID | DATE AND TIME | SATELLITE ID | IMAGE | CELL ID | CELL REGION | OBJECT |
| 20001 | 2019/1/1 12:00 | 30001 | ... | 40001 | ... | ... |
| ... | ... | ... | ... | ... | ... | ... |

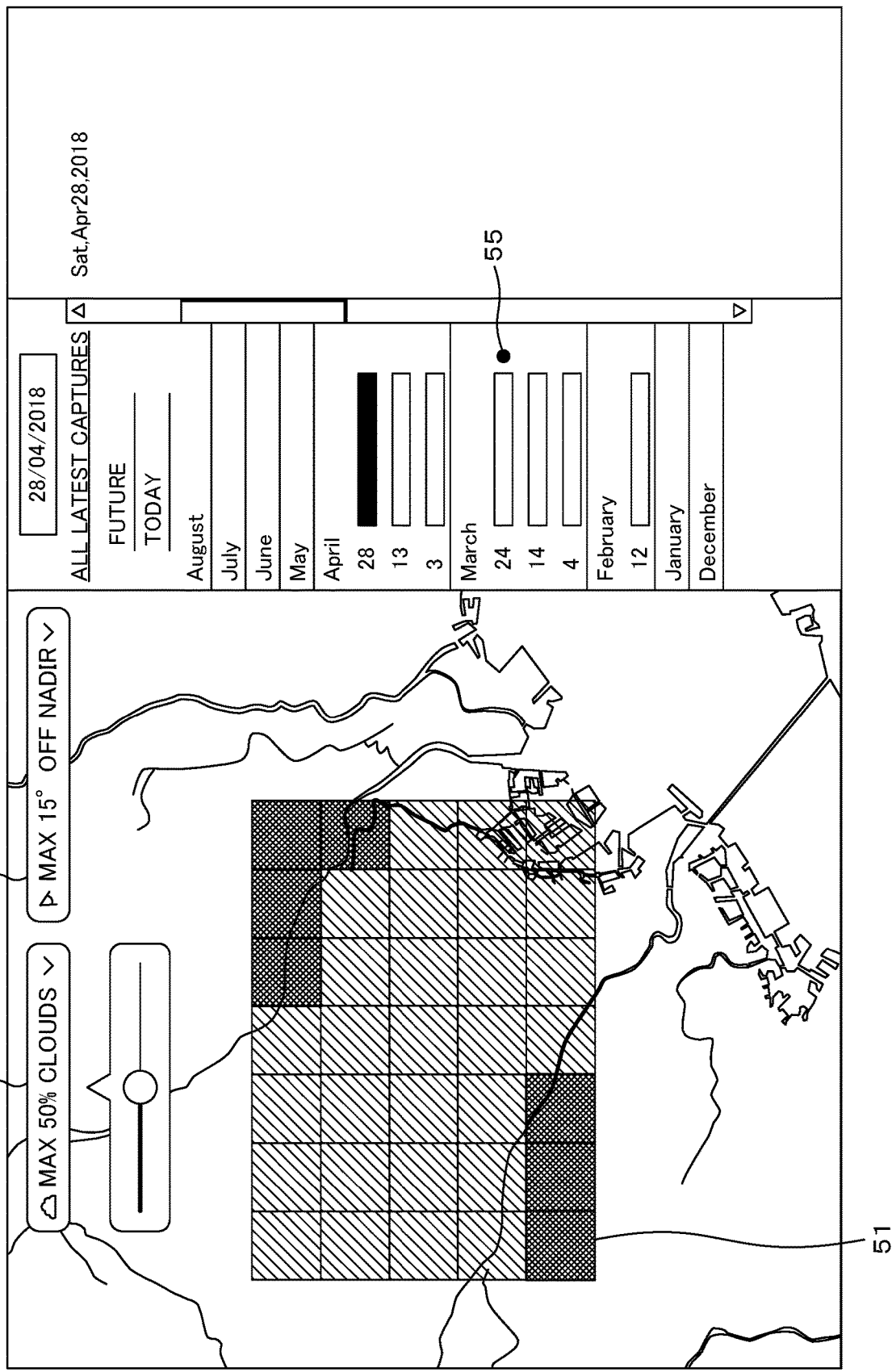

F I G. 13
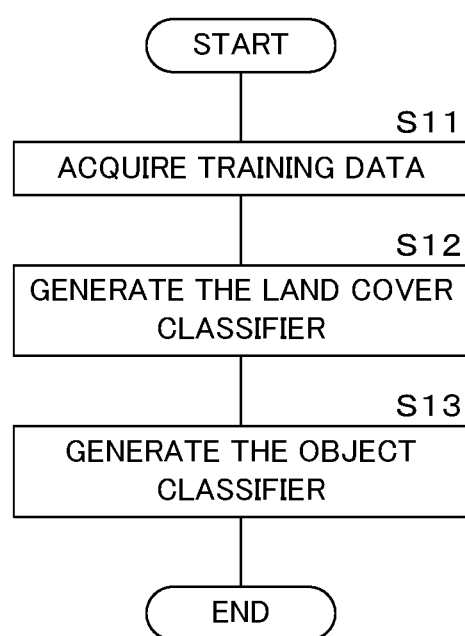

FIG. 18
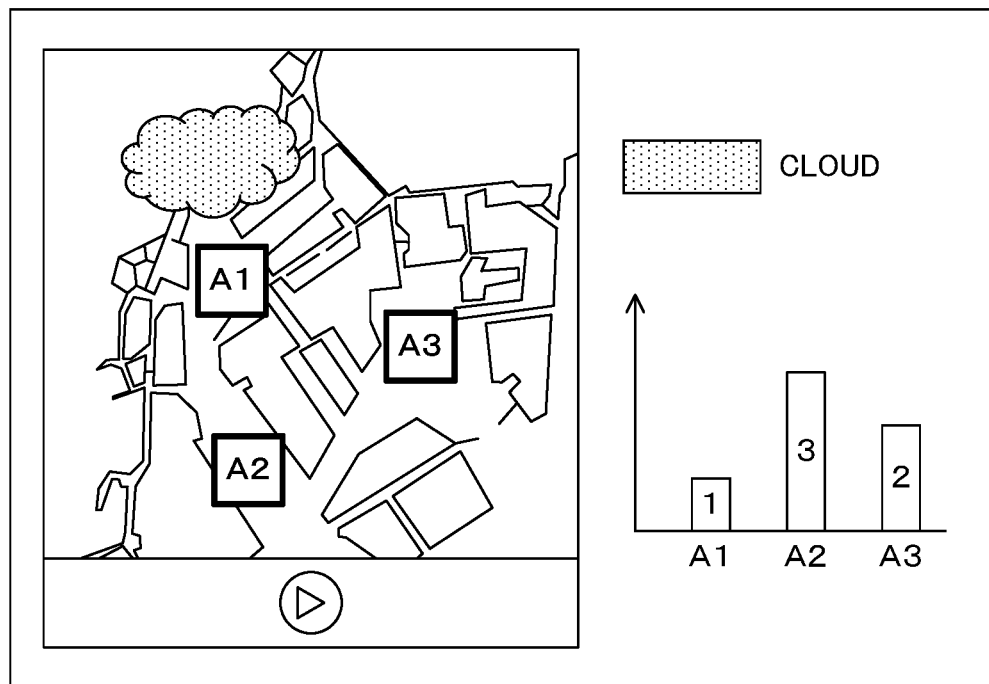
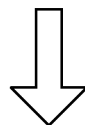
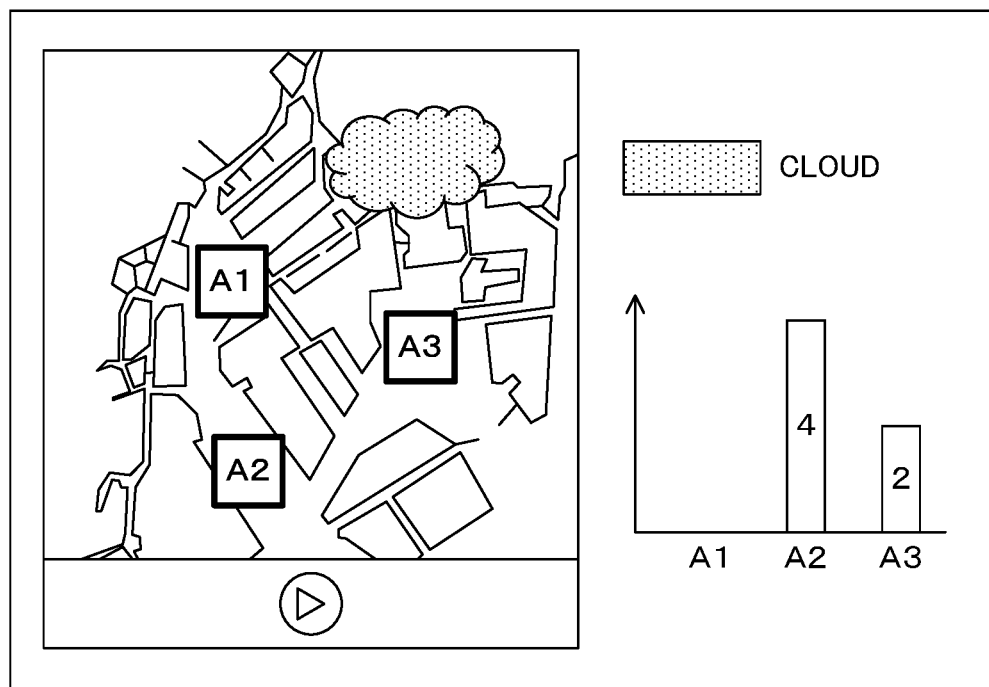

FIG. 23
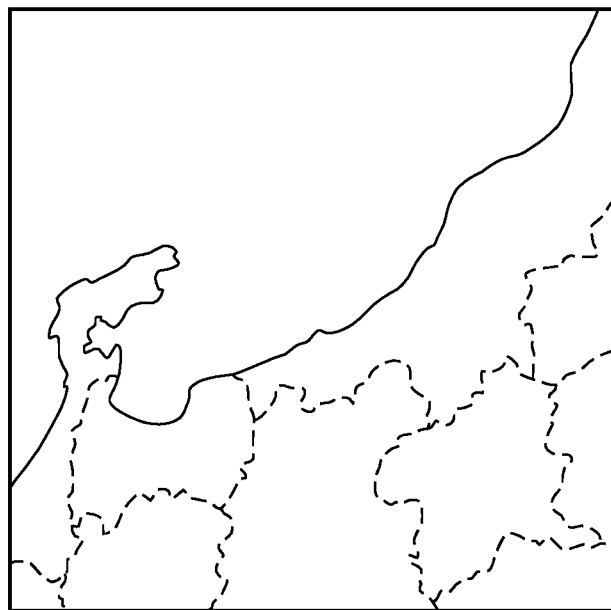
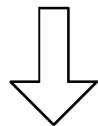
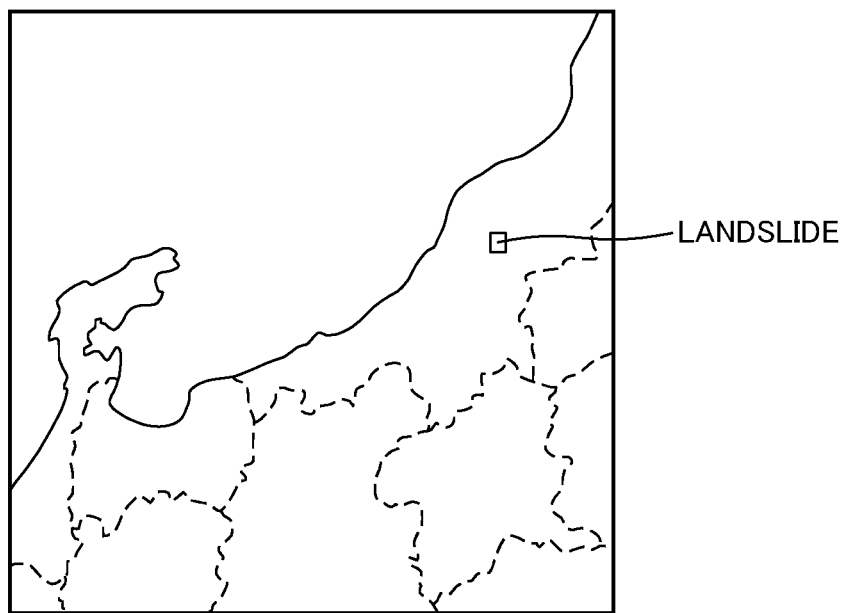

INFORMATION PROCESSING APPARATUS, INFORMATION PROCESSING METHOD AND NON-TRANSITORY COMPUTER-READABLE STORAGE MEDIUM

CROSS-REFERENCE TO RELATED APPLICATIONS

This application is a continuation application of PCT International Application No. PCT/JP2020/008732, which has an International filing date of Mar. 2, 2020 and designated the United States of America, and claiming priority on Patent Application No. 2019-053501 filed in Japan on Mar. 20, 2019.

BACKGROUND

Field

The present invention relates to an information processing apparatus, an information processing method and an information processing program.

Background Art

There are various services for providing satellite images shot by artificial satellites.

Japanese Patent Application Laid-Open No. 2009-146262, for example, discloses a satellite image selection support method, etc. that generates, if a purchase order for a satellite image is accepted, a masked image subjected to masking processing for masking a part that does not cover a purchase desired area and transmits the masked satellite image to the terminal of an orderer.

SUMMARY

However, data of an image such as a satellite image observed from space has a huge data size as compared with that of a general photography or the like, which makes it difficult for the user who acquires such observation data to handle it.

In one aspect, an object is to provide an information processing apparatus, etc. capable of readily acquiring easy-to-handle observation data.

In one aspect, an information processing apparatus comprising: one or more processing devices; and one or more storage devices storing instructions for causing the one or more processing devices to: store observation information obtained through observation of a target region on the earth from a flying object moving in outer space into the one or more storage devices; output to a terminal device a map image corresponding to the target region on which a dividing line for dividing the target region into a plurality of areas is superimposed; accept designation input for designating multiple ones of the plurality of areas divided by the dividing line from the terminal device; extract area observation information being a part of the observation information and corresponding to each of the multiple ones of the plurality of areas designated; and output to the terminal device the area observation information extracted.

In one aspect, it is possible to readily acquire easy-to-handle observation data.

The above and further objects and features will more fully be apparent from the following detailed description with accompanying drawings.

BRIEF DESCRIPTION OF DRAWINGS

FIG. 2 is a block diagram illustrating one example of the configuration of a server.
FIG. 3 illustrates one example of the record layout of a user DB and an image DB.
FIG. 12 illustrates one example of a display screen of the terminal.
FIG. 13 is a flowchart of one example of the processing procedure of classifier generation processing.
FIG. 18 illustrates one example of a display screen according to Embodiment 2.
FIG. 23 illustrates the outline of Embodiment 4.

DETAILED DESCRIPTION

The present invention is described below with reference to the drawings depicting embodiments.

Embodiment 1

Figure 1:
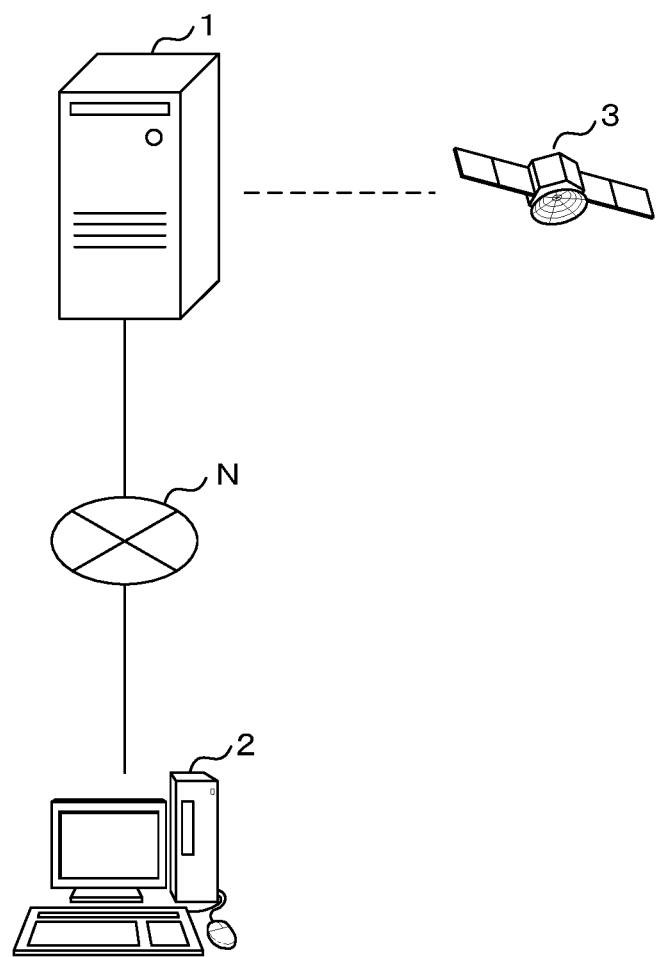
FIG. 1 is a schematic view illustrating one example of the configuration of a satellite image provision system.

FIG. 1 is a schematic view illustrating one example of the configuration of a satellite image provision system. In the present embodiment, a satellite image provision system allowing the user to purchase (use) a desired satellite image is described. The satellite image provision system includes an information processing apparatus 1, a terminal 2 and a satellite 3. The information processing apparatus 1 and the terminal 2 are communicatably connected to each other over the network N such as the Internet or the like.

The information processing apparatus 1 is an information processing apparatus capable of performing various information processing as well as transmitting and receiving information, and is, for example, a server device, a personal computer or the like. In the present embodiment, the information processing apparatus 1 is assumed as a server device and referred to as a server 1 for the sake of simplicity. The server 1 is a managing device for continuously acquiring satellite images obtained by shooting the surface of the earth from the satellite 3 as an artificial satellite to manage the acquired satellite image on a database and provides a platform allowing the user to purchase a satellite image. It is noted that the satellite image is image data of each pixel value within the image associated with the position information (information on latitude and longitude) of the corresponding location on the surface of the earth. In the present embodiment, several tens of compact satellites 3 each having a weight of several tens of kilograms present on a predetermined orbit over the earth. The server 1 acquires satellite images from the satellites 3 and manages them on the database. The server 1 accepts designation input for designating a geographical range (region) and a shooting date and time (shooting time point) of a satellite image desired to purchase by the user on a Web browser, extracts an image corresponding to the designated range and date and time from the satellite images on the database and provides the user with the image.

Though the following description is made assuming that a satellite image (photograph) shot by the satellite 3 detecting a visible ray, near infrared rays or the like is provided to the user in the present embodiment, the mode of the present embodiment is not limited thereto. For example, the satellite 3 may be provided with an optical sensor for detecting thermal infrared radiation and may provide data acquired by detecting infrared rays emitted by radiation (emission) from the surface of the earth. Furthermore, the satellite 3 may be provided with a microwave sensor (synthetic aperture radar, for example), not the optical sensor, for radiating microwave (radio wave) and detecting the microwave reflected from the surface of the earth, and may provide data observed by the microwave sensor. As such, the server 1 may be configured essentially to provide the user with observation information obtained by observing the surface of the earth from the satellite 3, and the observation information to be provided is not limited to an image based on a visible ray.

Though the surface of the earth is observed by the artificial satellite (satellite 3) in the following description, that the server 1 may be configured essentially to provide the user with data observed by any flying object moving in the space, and the flying object is not limited to the artificial satellite.

In the present embodiment, when providing the user with a satellite image, the server 1 provides the user with data of a satellite image including a classification result obtained by classifying a target object (object) within the satellite image using a classifier generated by machine learning. Specifically, as will be described later, the server 1 provides a satellite image to which metadata is added that indicates a land cover within a satellite image and the number of movable objects present at each area of the satellite image by using a land cover classifier for classifying a land cover (for example, cloud covering the surface of the earth, water, trees, bare ground, etc.) covering the surface of the earth and an object classifier for classifying a specific object (for example, a movable object such as a vehicle, a ship, etc.) present on the surface of the earth.

The terminal 2 is a terminal device operated by the user and is a personal computer, for example. It is noted that the terminal 2 may be a smartphone, a tablet terminal or other devices. The terminal 2 accesses the server 1 in response to operation input by the user and performs a purchase request for a satellite image (divided image to be described later) to download the satellite image from the server 1 and displays the downloaded image.

Though the description is made assuming that a satellite image is sold to the user so as to be downloaded to the terminal 2 in the present embodiment, a satellite image may be made available for a certain period of time according to a contract with the user in a subscription form, for example. The server 1 may be configured essentially to output a satellite image from the terminal 2 in accordance with a request for use so that the image is available to the user, not necessarily selling each satellite image for the user to download the image in the terminal 2.

FIG. 2 is a block diagram illustrating one example of the configuration of the server 1. The server 1 is provided with a control unit 11, a main storage unit 12, a communication unit 13 and an auxiliary storage unit 14.

The control unit 11 includes one or more arithmetic processing devices such as a central processing unit (CPU), a micro processing unit (MPU), a graphics processing units (GPU) or the like and performs various information processing, control processing, etc. by reading and executing a program P stored in the auxiliary storage unit 14. The main storage unit 12 is a temporary storage area such as a static random access memory (SRAM), a dynamic random access memory (DRAM), a flash memory or the like and temporarily stores data required for the control unit 11 to execute arithmetic processing. The communication unit 13 is a communication module for performing communication processing as well as transmits and receives information with the outside.

The auxiliary storage unit 14 is a nonvolatile storage area such as a large capacity memory, a hard disk or the like and stores a program P required for the control unit 11 to execute processing and other data. Moreover, the auxiliary storage unit 14 stores a user DB 141, an image DB 142, a land cover classifier 143 and an object classifier 144. The user DB 141 is a database storing information on each of the users. The image DB 142 is a database storing satellite images acquired from the satellite 3. The land cover classifier 143 is a learned model generated by machine learning and is a classifier for classifying a land cover that covers the surface of the earth. Likewise, the object classifier 144 is a learned model generated by machine learning and is a classifier for classifying an object (movable object) present on the surface of the earth.

It is noted that the auxiliary storage unit 14 may be an external storage device connected to the server 1. Moreover, the server 1 may be a multicomputer formed by multiple computers or may be a virtual machine virtually constructed by software.

In the present embodiment, the server 1 is not limited to the above-described ones and may include, for example, an input unit for accepting operation input, a display unit for displaying an image, etc. Furthermore, the server 1 may include a reading unit for reading a portable storage medium P1 such as a compact disc (CD)-ROM, a digital versatile disc (DVD)-ROM or the like and read a program P from the portable storage medium P1 to execute the program P. Alternatively, the server 1 may read out a program P from a semiconductor memory P2.

FIG. 3 illustrates one example of the record layout of the user DB 141 and the image DB 142.

The user DB 141 includes a user ID column, a name column, a user information column and a purchased image column. The user ID column stores the user ID for identifying each user. The name column, user information column and purchased image column respectively store a user name, other information on the user and information on the image purchased by the user in association with the user ID. The user information column stores account information, information required for making a payment upon purchasing an image and other information of the user on the platform. The purchased image column stores, for example, an ID for identifying a divided image, which will be described later.

The image DB 142 includes an image ID column, a date and time column, a satellite ID column, an image column, a cell ID column, a cell region column and an object column. The image ID column stores an image ID for identifying a satellite image acquired from the satellite 3. The date and time column, the satellite ID column, the image column, the cell ID column, the cell region column and the object column respectively store a date and time when a satellite image is shot, the ID of a satellite 3 that shoots the satellite image, a shot satellite image, a cell ID for identifying a cell image (divided image), which will be described later, obtained by dividing the satellite image by predetermined unit, coordinates information of an area within the satellite image corresponding to the cell image and a classification result of each object (target object) contained in the cell image in association with the image ID.

Figure 4:
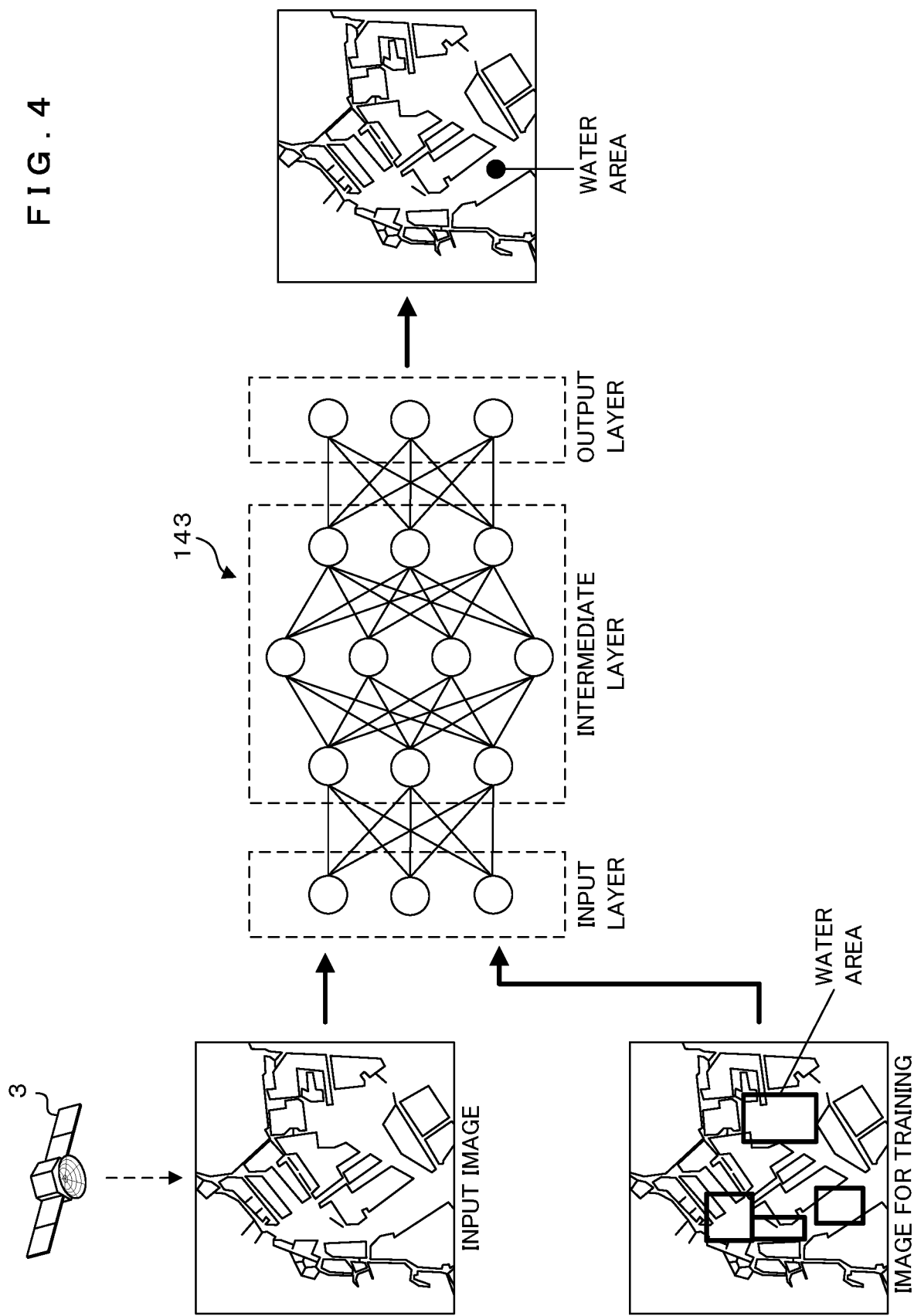
FIG. 4 illustrates land cover classification processing.

FIG. 4 illustrates land cover classification processing. In the present embodiment, as described above, the server 1 performs processing of classifying a target object within a satellite image, specifically, a land cover and a movable object by using classifiers generated by machine learning. FIG. 4 conceptually illustrates the details of the processing related to a land cover out of the land cover and the movable object. The processing details of the land cover classification processing is described with reference to FIG. 4.

For example, the server 1 performs machine learning to learn the features of a land cover by deep learning to thereby generate the land cover classifier 143. The land cover classifier 143 is a neural network related to a convolution neural network (CNN), for example and includes an input layer for accepting input of a satellite image (observation information), an output layer for outputting a classification result of a land cover contained in the satellite image and an intermediate layer for extracting feature values of the satellite image.

The input layer includes multiple neurons accepting pixel values of respective pixels contained in a satellite image and passes the input pixel values to the intermediate layer. The intermediate layer includes multiple neurons extracting image feature values of the satellite image and passes the extracted feature values to the output layer. If the land cover classifier 143 is a CNN, the intermediate layer includes convolution layers for convoluting the pixel values of the respective pixel values input from the input layer and pooling layers for mapping the pixel values convoluted in the convolution layer, the convolution layers and the pooling layers being alternately connected, and finally extracts the feature values of the satellite image while compressing the pixel information of the satellite image. The output layer includes one or more neurons that output the classification results of the land cover and classifies the land cover that covers the surface of the earth based on the image feature values output from the intermediate layer.

Though the following is described assuming that the land cover classifier 143 is, but not limited to, a CNN in the present embodiment, the land cover classifier 143 may be a learned model that is constructed by another learning algorithm such as a neural network other than the CNN, a support vector machine (SVM), a Bayesian network, a regression tree or the like.

The server 1 performs learning by using training data including multiple satellite images obtained by shooting the surface of the earth from the satellite 3 that are associated with correct answer values as classification results obtained when the land covers of the satellite images are classified. The server 1 inputs a satellite image included in the training data to the input layer, followed by arithmetic processing in the intermediate layer and acquires an output value indicating the classification result of the land cover from the output layer. It is noted that the output value is a discrete value (value of "0" or "1," for example) or a continuous probability value (value in the range of "0" to "1," for example).

Here, since the satellite image shot by the satellite 3 has a huge data size, the server 1 inputs, as the image data to be input to the land cover classifier 143, divided images (for example, cell images to be described later) obtained by dividing a satellite image by predetermined unit, not the satellite image as it is (raw data), and classifies them. This makes it possible to reduce an arithmetic load required to perform processing on individual images and suitably perform the classification processing.

The server 1 compares the output value from the output layer with the information labeled on the satellite image in the training data, i.e., the correct answer value to thereby optimize the parameters used for the arithmetic processing in the intermediate layer such that the output value approximates the correct answer. The parameters include a weight between the neurons (coupling coefficient) and a coefficient of an activation function used in each of the neurons, for example. Though the method of optimizing parameters is not limited to a particular method, the server 1 optimizes various parameters by using backpropagation, for example. The server 1 performs the above-described processing on each of the satellite images included in the training data to generate the land cover classifier 143.

The server 1 generates the land cover classifier 143 related to semantic segmentation which is one type of the CNN, for example. The semantic segmentation is a method of performing class determination by pixel indicating which object (target object) each pixel within the image represents. Data used here includes information (correct answer value) indicating the type of the land cover that is attached as a label to the image area corresponding to each type of land covers in the satellite image. The server 1 inputs the satellite image included in the training data to the land cover classifier 143, acquires the output value indicating the classification result of each land cover by pixel and optimizes the parameters by comparing the output value with the correct answer value to thereby generate the land cover classifier 143 that allows for classification by pixel indicating which land object each pixel represents.

If a satellite image is acquired from the satellite 3, the server 1 performs classification of a land cover by using the land cover classifier 143. The land cover is a predetermined object covering the surface of the earth and is classified as cloud, woods, a bare ground, water areas, ice and snow, artificial objects, etc. It is noted that such classification is exemplification, and the land cover is not limited to the above-described ones. The server 1 divides a satellite image into images by predetermined unit and inputs the divided images to the input layer of the land cover classifier 143, performs computation for extracting image feature values in the intermediate layer and inputs the extracted feature values to the output layer. The server 1 acquires from the output layer the classification result by pixel indicating which type of land cover each pixel represents as an output value.

Though the following is described assuming that the server 1 generates the land cover classifier 143 by supervised learning in the present embodiment, the land cover classifier 143 may be generated by semi-supervised learning or unsupervised learning. The same applies to the object classifier 144 to be described later.

Figure 5:
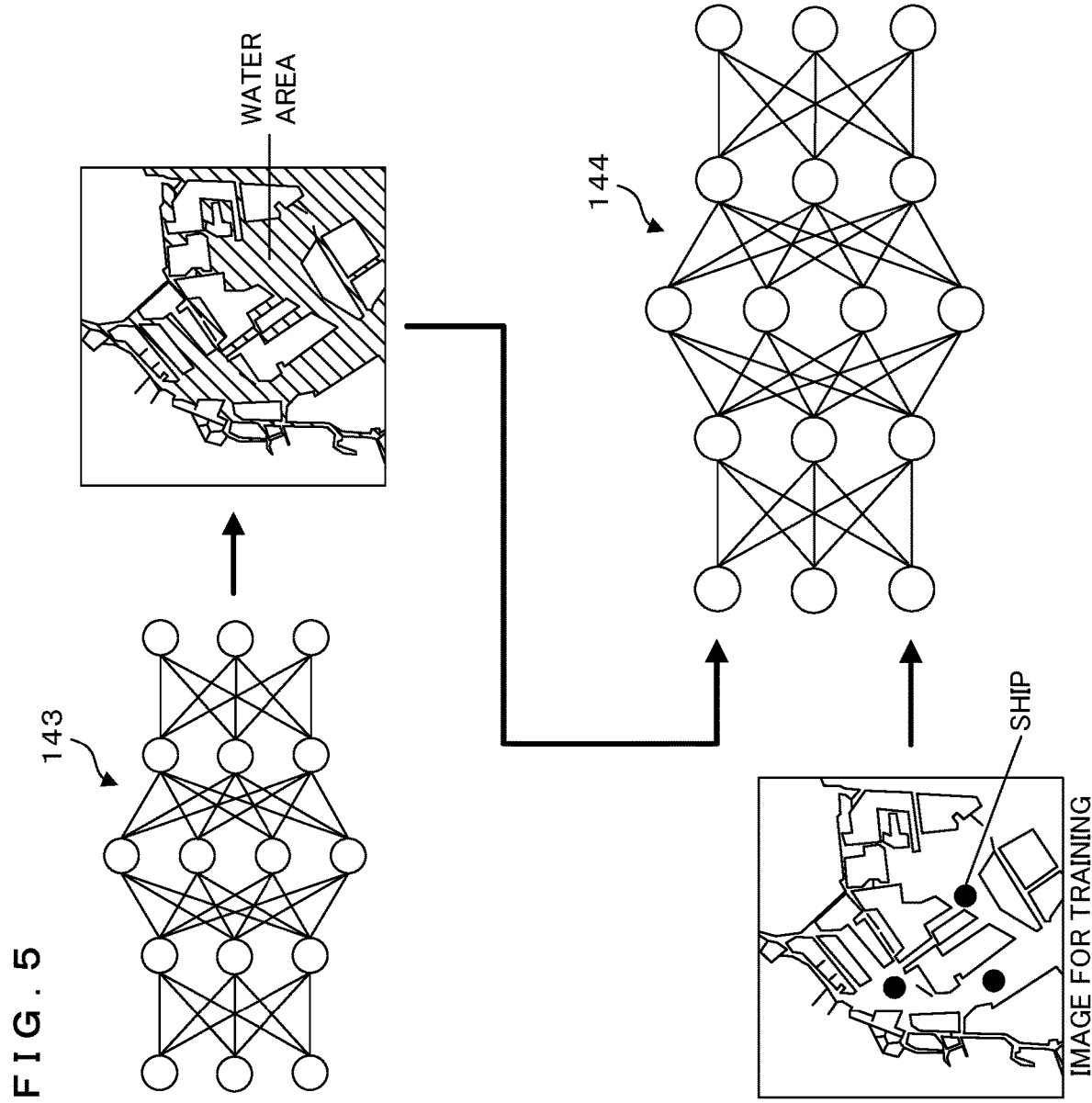
FIG. 5 illustrates object classification processing.

FIG. 5 illustrates object classification processing. FIG. 5 conceptually illustrates measurement of the number of specific objects, specifically, movable objects (for example, vehicles, ships, etc.) contained in a satellite image by using the object classifier 144. The processing details of the object classification processing are described with reference to FIG. 5.

The object classifier 144 is a neural network, which is related to the CNN, generated by deep learning similarly to the above-mentioned land cover classifier 143. Similarly to the land cover classifier 143, the object classifier 144, which includes an input layer, an intermediate layer and an output layer, accepts input of a satellite image and outputs a classification result obtained by classifying movable objects within the satellite image.

The server 1 performs learning by using training data including a correct answer value for a classification result obtained when a movable object is classified, the correct answer value being associated with each of the satellite images. Similarly to learning with the land cover classifier 143, the server 1 divides each of the satellite images included in the training data by predetermined unit and inputs the divided ones to the object classifier 144 while acquiring the classification result of the movable object as an output value. The server 1 compares the output value with the correct answer value to optimize parameters such as weights or the like, to thereby generate the object classifier 144.

For example, the server 1 performs learning by using training data including a correct answer value indicating the type of the movable object that is attached as a label to a coordinate point (plot) corresponding to each of the movable objects present in a satellite image. The resolution of the satellite images is often too low to extract feature values such as the shape and color of each of the movable objects and detect an object. Hence, the server 1 learns feature values of each predetermined unit area (see a rectangular frame at the lower right of FIG. 5) within the image and the number of movable objects (the number of plots) present in each area based on the plotted coordinate point of the movable object in the training data to thereby generate the object classifier 144 that directly estimates the number of movable objects without detecting (recognizing) individual movable objects. This makes it possible to accurately estimate the number of movable objects even if the resolution is low.

It is noted that individual movable objects may be detected to thereby measure the number of movable objects by the object classifier 144 depending on the resolution of a satellite image. That is, the object classifier 144 may be configured essentially to estimate the number of movable objects, and the algorithm therefor is not limited to a particular one.

The server 1 inputs a satellite image shot by the satellite 3 to the object classifier 144 while acquiring a classification result that is obtained by classifying the movable objects contained in the satellite image and that indicates the number of movable objects as an output value. As illustrated at the lower right of FIG. 5, for example, the server 1 acquires an estimation result obtained by estimating the number of movable objects for each area in the image.

Here, when inputting a satellite image to the object classifier 144, the server 1 narrows down the image area within the satellite image according to the classification result of the land cover by the land cover classifier 143 and inputs the narrowed area. This allows the server 1 to reduce a load on the arithmetic processing using the object classifier 144.

In the case where the movable object as a target to be classified is a ship, for example, the image area to be taken into account as an analysis target is water areas such as sea, river, etc. Here, if making a classification of a ship, the server 1 specifies the image area corresponding to the water areas with reference to the classification result of the land cover and inputs the specified image area to the object classifier 144. This allows the server 1 to acquire the classification result indicating the number of ships present at the water areas as an output value as illustrated at the lower right of FIG. 5.

It is noted that the movable object such as a ship, a vehicle, etc. are mere examples of objects to be classified by using the object classifier 144, and the object may be a static object present at a fixed location.

As described above, the server 1 performs classification processing for a land cover and a movable object from a satellite image by using the land cover classifier 143 and the object classifier 144, respectively. The server 1 sequentially acquires satellite images obtained by shooting each target region at shooting time points (observation time points) from each of multiple satellites 3, 3, . . . and classifies the satellite images. The server 1 stores each of the satellite images and the classification result of the satellite image in association with the shooting time point and the target region in the image DB 142.

FIGS. 6 to 12 each illustrate one example of a display screen of the terminal 2. The outline of the present embodiment is described with reference to FIGS. 6 to 12.

Figure 6:
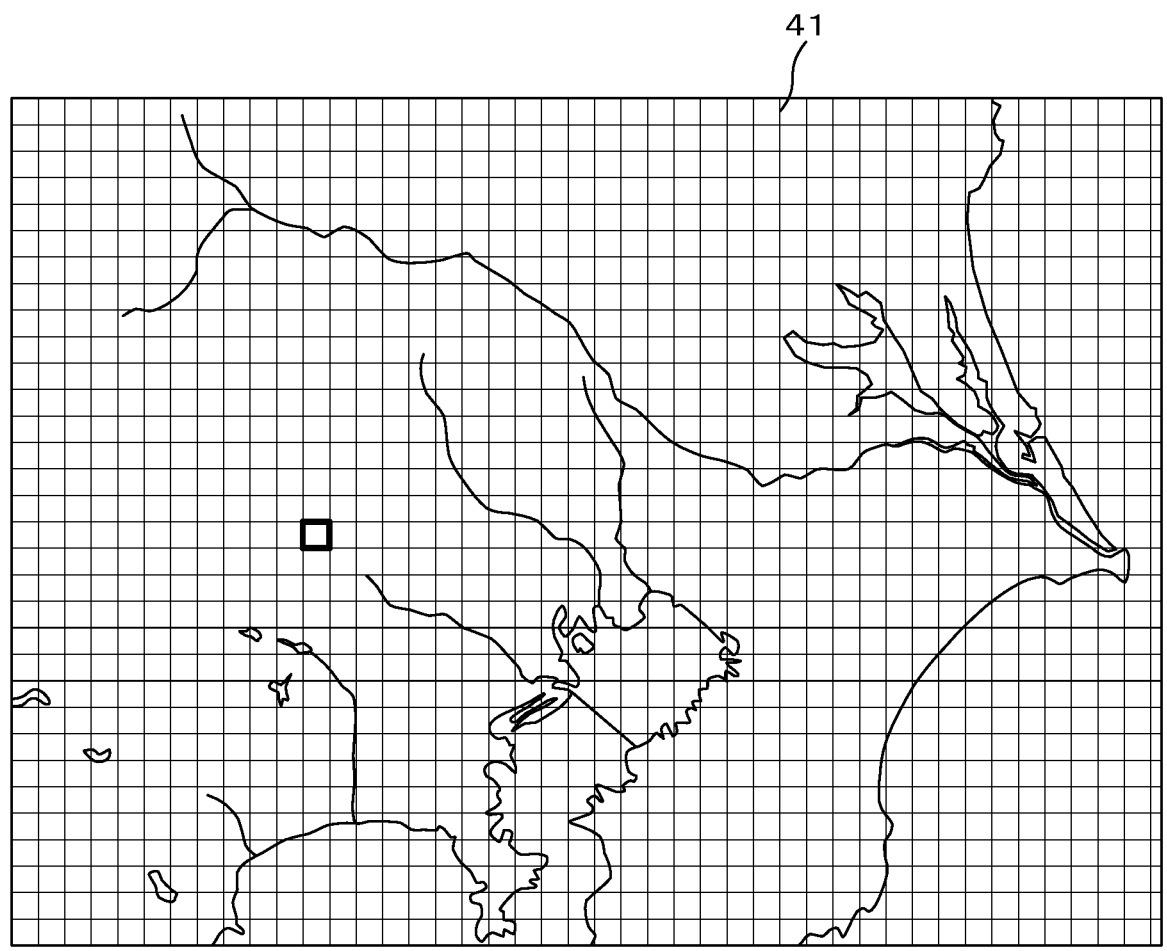
FIG. 6 illustrates one example of a display screen of a terminal.

The server 1 in the present embodiment provides a platform to sell a satellite image acquired from each of the satellites 3 to the user. FIG. 6, which is one example of a display screen displayed on the terminal 2, illustrates a display example of a Web browser screen related to the present platform. The server 1 provides the user with a satellite image labeled with the classification results obtained by using the land cover classifier 143 and the object classifier 144 in response to operation input on the screen.

For example, the terminal 2 searches for a target region to be purchased based on operation input performed on the screen (not illustrated) and displays the screen illustrated in FIG. 6. More specifically, as illustrated in FIG. 6, the terminal 2 displays a map image representing the target region.

The terminal 2 displays a grid 41 (dividing line) for dividing the target region into multiple areas with a predetermined width in row and a predetermined width in column while being superimposed on the map image. Though the width (distance) of each area divided by the grid 41 is not limited to a particular value, the width of 5 km in all directions is set in the present embodiment.

In the present embodiment, though the grid 41 is set to extend along a north-south direction and an east-west direction in accordance with latitude and longitude so as to divide the map image to rectangles, the way of drawing (direction) of the grid 41 is not particularly limited thereto. Furthermore, the user may arbitrarily set a dividing line to set any area available as a purchase target region.

Moreover, the grid 41 is a rough approximation set when a target region is divided into multiple areas, and cell images to be described later do not necessarily precisely match the areas on the map image divided by grid 41. For example, the neighboring cell images may be overlapped with each other.

The terminal 2 accepts designation input for designating multiple areas as a target to be purchased (target to be used) from the areas divided by the grid 41. The terminal 2 accepts designation input for designating multiple areas by drag operation, click operation or the like performed on the screen, for example. If accepting designation input of the areas as a target to be purchased, the terminal 2 makes communication with the server 1 to shift to the screen illustrated in FIG. 7.

If accepting designation input for designating the areas to be purchased from the terminal 2, the server 1 searches the image DB 142 for a satellite image including the designated areas. The server 1 then extracts cell images (area observation information) obtained by cutting out the image area corresponding to the areas designated on the map image from the searched satellite image. The server 1 outputs the extracted cell images to the terminal 2 and causes the terminal 2 to display the images.

Figure 7:
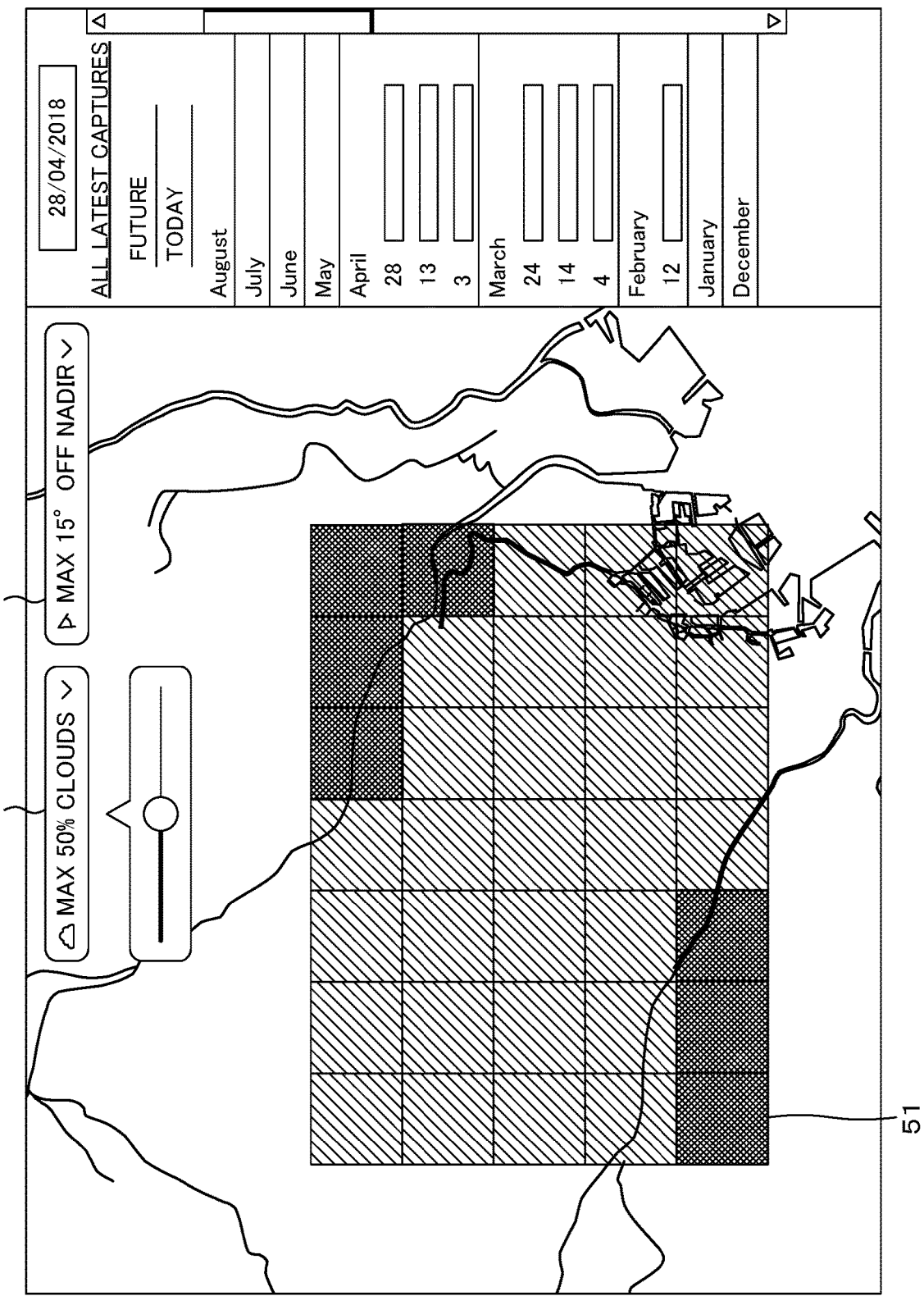
FIG. 7 illustrates one example of a display screen of the terminal.

More specifically, as illustrated in FIG. 7, the server 1 displays a preview image in which the cell images 51 extracted from the satellite image (observation information) of the target region are superimposed on the corresponding areas on the map image. It is noted that in the drawings of the present embodiment, the areas on which the satellite image (photograph) is to be displayed are hatched for convenience of drawing. At the time of displaying the preview image in FIG. 7, the server 1 first displays cell images 51 extracted from the satellite image shot at the latest shooting time point (observation time point) out of the multiple satellite images obtained when the target region is shot at the past shooting time points. The cell images 51 as a target to be purchased are displayed so as to be superimposed on the map image, whereby the user can easily perceive the location of the cell images while confirming the preview image.

Here, the terminal 2 displays a cloud amount setting section 52 and an angle setting section 53 for respectively narrowing down the amount of cloud and an off-nadir angle (shooting angle) at a predetermined position of the preview image. The terminal 2 accepts input of set values for the cloud amount and/or off-nadir angle at the respective setting sections and switches a display manner of the cell images 51 depending on whether or not the set values are satisfied.

The cloud amount is a ratio of the area of the cloud to the shot range (observation range) of the satellite image. If the user purchases a satellite image (cell images 51) and due to a large amount of cloud within the image, the user can hardly confirm the surface of the earth, it is difficult to say that this image is useful for the user. Hence, in the present embodiment, narrowing down the cell images depending on the amount of cloud is made possible at the time of displaying the preview image. For example, the terminal 2 accepts a setting input for setting the upper limit value of the amount of cloud in the area of each of the cell images 51 at the time of shooting (observation time point) by the cloud amount setting section 52. This makes it possible for the terminal 2 to narrow down the cell images 51.

The off-nadir angle is a shooting angle obtained when the satellite 3 shoots a target region (area of each cell image 51) and is an angle formed by a normal line connecting the satellite 3 at the time of shooting (observation) and the surface of the earth and a straight line connecting the satellite 3 and the target region (area). Though the "off-nadir angle" naturally means an illuminating angle of a microwave in the synthetic aperture radar, it is temporarily used to express a shooting angle obtained when a target region is shot from the satellite 3 for the sake of convenience in the present embodiment.

In the case of a high off-nadir angle, a satellite image (cell image 51) is an image obtained by shooting the target region obliquely, not directly overhead. Accordingly, regardless of the desire for an image obtained by shooting a building directly overhead, the user purchases an image obtained by shooting a building obliquely as a result. Hence, in the present embodiment, narrowing the cell images depending on the off-nadir angle is made possible at the time of displaying a preview image.

For example, the server 1 calculates the angle formed by a normal connecting the satellite 3 and the surface of the earth and a direct line connecting the satellite 3 and the center point of the area of each cell image 51 as an off-nadir angle related to each cell image 51. The terminal 2 accepts setting input for setting the upper limit value of the off-nadir angle at the time of shooting (observation time point) by the angle setting section 53. According to the upper limit values for the cloud amount and/or the off-nadir angle set above, the terminal 2 displays the cell images 51 in a different manner between the cell image 51 having a value equal to or less than the upper limit value and the cell image 51 having a value above the upper limit value. For example, the terminal 2 displays the cell image 51 having a value above the upper limit value so as to be darker than the cell image 51 having a value equal to or less than the upper limit value. In FIG. 7, display in dark color is represented by shades of the color of the hatching for the sake of convenience. By the above-described switching display, the user can purchase a satellite image (cell image 51) for which the cloud amount and/or the off-nadir angle satisfy a predetermined condition.

Furthermore, the terminal 2 accepts designation input for changing the cell images 51 to be purchased from the images shot at the latest time point to the images shot at another time point in the past. For example, the terminal 2 displays in list form the shooting time points of the satellite images that are stored in the image DB 142 and that are obtained by shooting a target region in an operation menu at the right of the screen. The terminal 2 accepts designation input for designating any shooting time point in the past by the operation menu.

If another time point is designated, the terminal 2 accesses the server 1 to acquire cell images 51 obtained by extracting the areas designated by the user from the satellite image shot at the designated time point. The terminal 2 switches the cell images 51 superimposed on the map image to the cell images 51 newly acquired and displays the switched image. If change to another time point is further designated, the terminal 2 switches the screen display to the image at the designated time point and displays the switched image. By repeating the above-described processing, the user can select an image to be purchased while simply switching images shot at respective time points in the past for confirmation.

In the case where the cell image 51 is to be purchased, the terminal 2 registers a cell image 51 in a cart in response to operation input from the user. The cart is a list for tentatively registering a cell image 51 to be purchased. For example, the terminal 2 accepts click operation for any of the cell images 51 that are being displayed and registers the operated cell image 51 in the cart.

Figure 8:
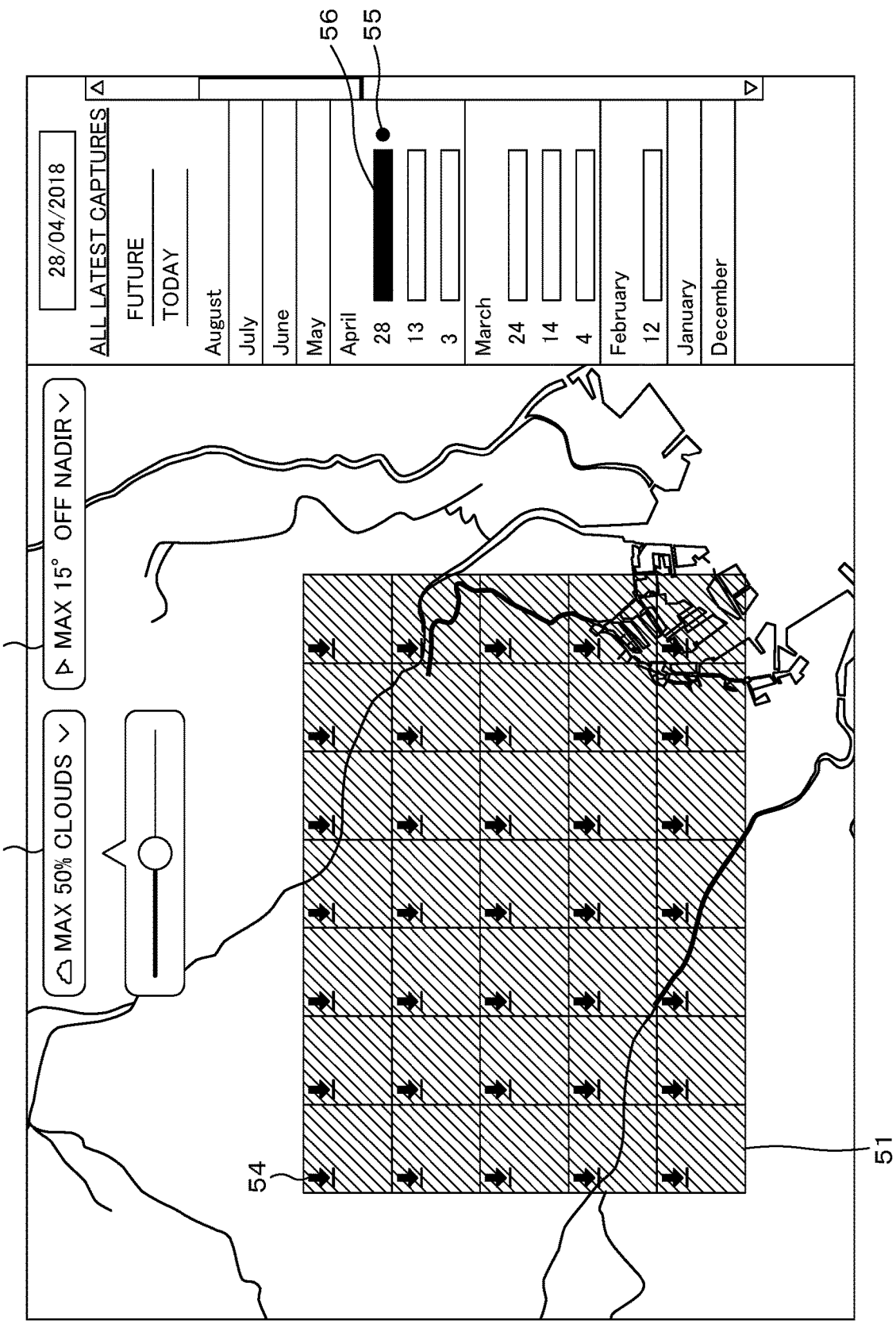
FIG. 8 illustrates one example of a display screen of the terminal.

FIG. 8 illustrates one example of a display screen after registration in the cart. If a cell image 51 is registered in the cart, the terminal 2 displays each registered cell image 51 labeled with an icon 54. Displaying the icon 54 allows the user to easily grasp that the cell image 51 that is being displayed has already been registered in the cart. Furthermore, the terminal 2 displays at the operation menu a dot mark 55 associated with the shooting time point (date and time) of the cell images 51 that are being displayed and a bar 56 having a length corresponding to the amount (the number) of the cell images 51 registered in the cart if some cell images 51 are registered in the cart. This allows the user to easily grasp the time point when the registered cell images 51 were shot and the number of registered cell images 51.

Figure 9:
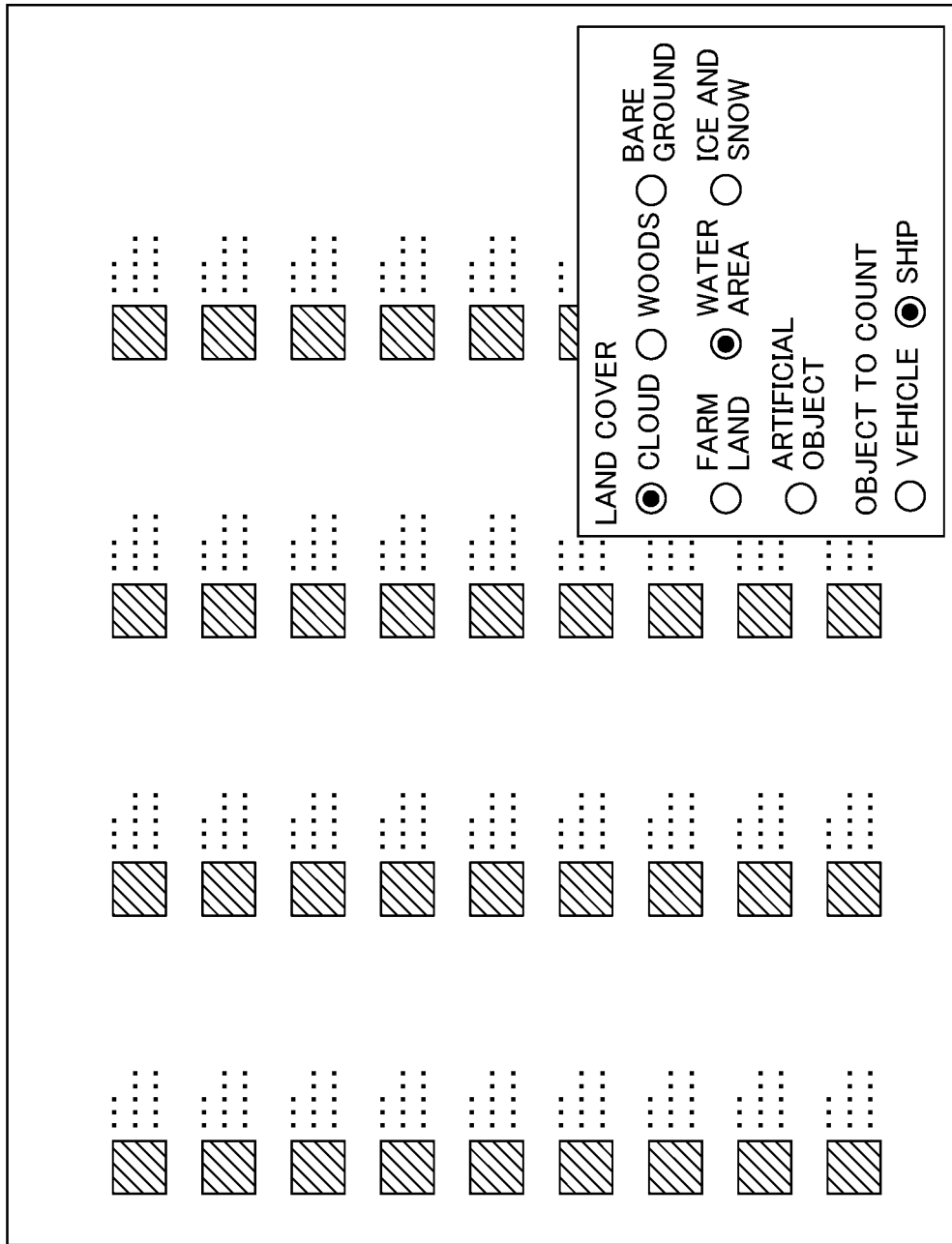
FIG. 9 illustrates one example of a display screen of the terminal.

If the user proceeds to apply for purchase of some cell images 51, the terminal 2 shifts to a purchase application screen. FIG. 9 illustrates one example of a display screen displayed at the time of purchase application. As illustrated in FIG. 9, the terminal 2 displays the thumbnail images of the cell images 51 that are being registered in the cart in list form as well as a purchase amount (not illustrated).

In this case, the terminal 2 accepts designation input for designating a target object desired by the user as a target to be classified for the cell images 51 to be purchased. For example, the terminal 2 accepts designation input for designating the type of the land cover and the movable object to be targeted as illustrated at the lower right of FIG. 9.

The terminal 2 transmits a purchase request (use request) for cell images 51 including the details of the designation of the target object to the server 1 in response to operation input by the user. If accepting the purchase request from the terminal 2, the server 1 performs processing of settling the purchase price according to the number of cell images 51 to be purchased. It is noted that the server 1 may vary the purchase amount depending on the number of types of the target object designated above.

After completion of the purchase processing, the server 1 outputs the purchased cell images 51 to the terminal 2 and causes the terminal 2 to download them. In this case, the server 1 outputs data of the cell images 51 including the classification result of the target object designated by the user to the terminal 2. For example, the server 1 outputs image data of the cell images 51 to which metadata indicating the classification result of the target object is added to the terminal 2. This allows the user to not merely receive a satellite image but also receive data of the analyzed satellite image.

It is noted that though a satellite image to which a classification result (metadata) of the target object is added is provided in the present embodiment, the image to be provided is not limited thereto. Alternatively, data of an image itself that is so processed as to show the position and the range of the target object within the image may be provided. For example, the server 1 may generate a satellite image (cell image 51) in which the area of the land cover to be targeted is sorted by color like color-coding display to be describe later and output the colored image to the terminal 2. Hence, the server 1 may be configured essentially to output a satellite image including the classification results of the target object, and the output manner of the image data to be output is not limited to a particular one.

Figure 10:
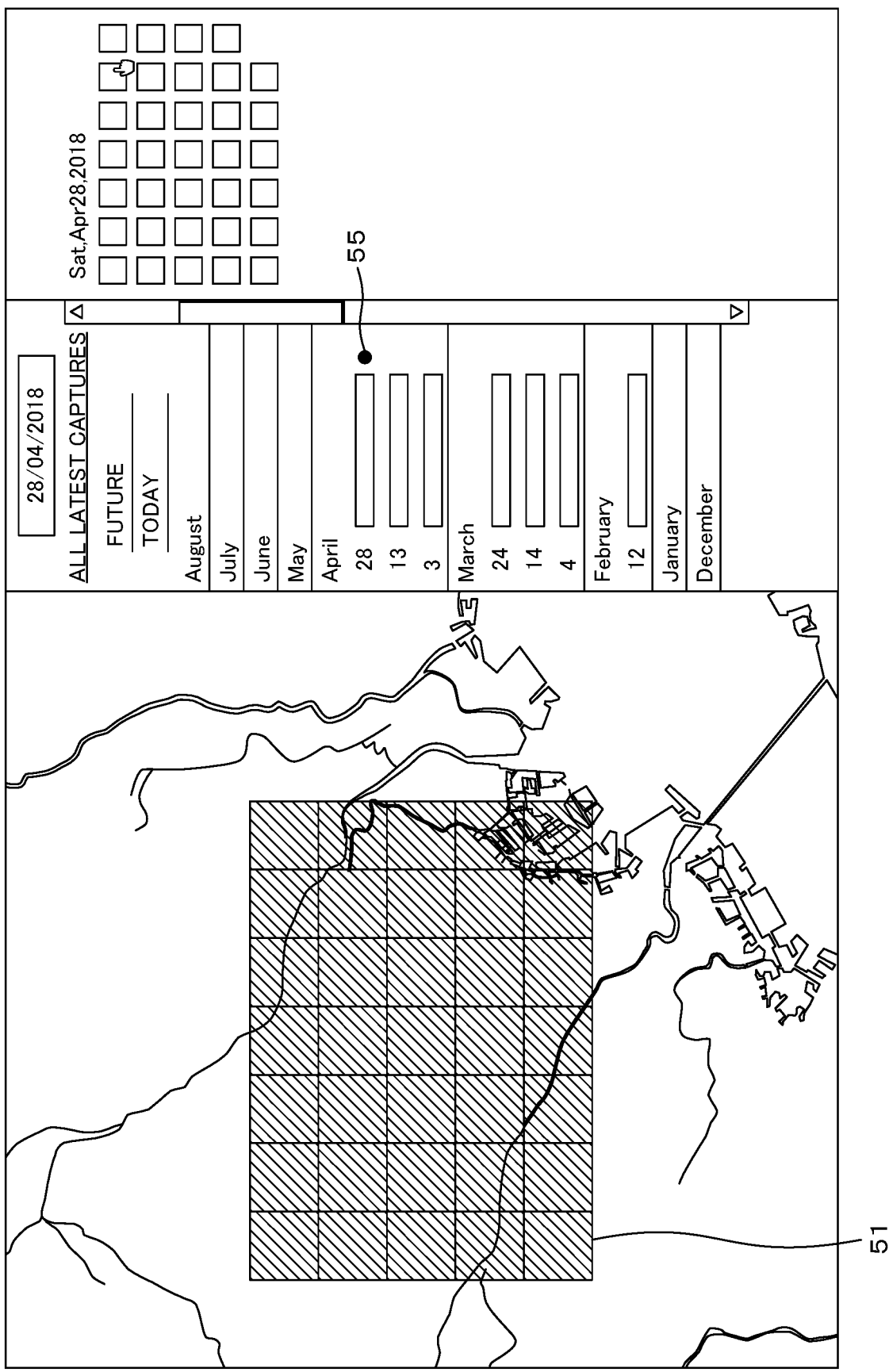
FIG. 10 illustrates one example of a display screen of the terminal.

FIG. 10 illustrates one example of a display screen at the time of browsing purchased cell images 51. In the present embodiment, the server 1 makes the purchased cell images 51, i.e., the cell images 51 available to the user browsable on the same platform (Web browser screen) as they are purchased.

The terminal 2 accepts selection input for selecting cell images 51 as a target to be browsed out of the cell images 51 that have been downloaded from the server 1 on a screen (not illustrated). The terminal 2 displays the selected cell images 51. In this case, the terminal 2 displays the selected cell images 51 superimposed on the corresponding areas of the map image.

More specifically, the terminal 2 displays the cell images 51 superimposed on the map image while displaying the dot mark 55 applied to the shooting time corresponding to the cell images 51 that are being displayed at the operation menu. This allows the user to easily grasp where and when the images are shot similarly to purchasing time.

Figure 11A:
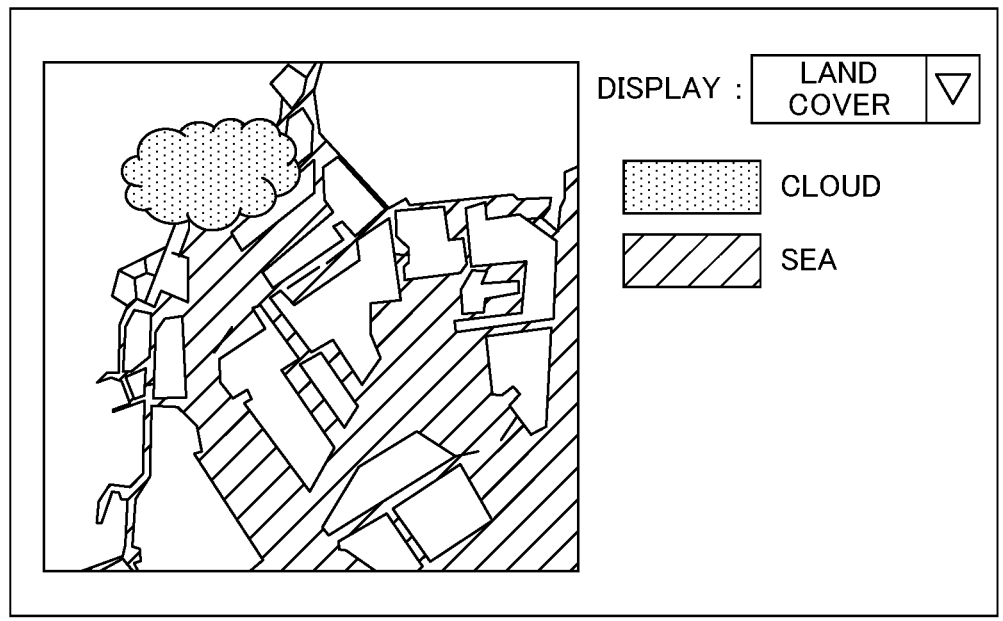
FIG. 11A illustrates one example of a display screen of the terminal.
Figure 11B:
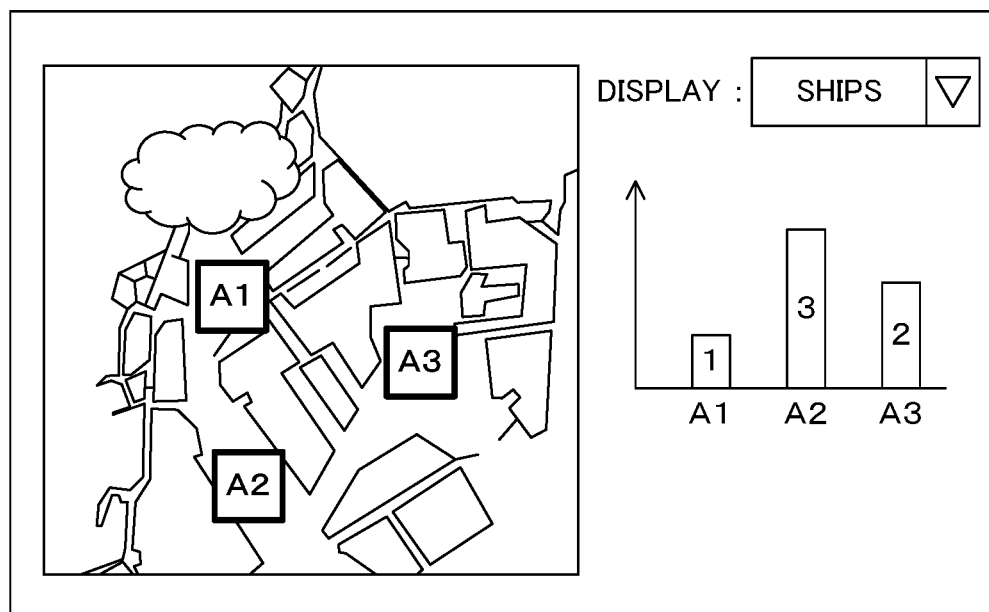
FIG. 11B illustrates one example of a display screen of the terminal.

Next, the details of the processing at the time of browsing the classification result of target objects contained in the purchased cell image 51 is described. FIGS. 11A and 11B each illustrate one example of a display screen of the classification result. For example, if accepting designation input for designating any one of the cell images 51 superimposed on the map image shown in FIGS. 11A and 11B, the terminal 2 displays the classification result of the target objects related to the designated cell image 51.

FIG. 11A illustrates one example of the display screen related to a land cover while FIG. 11B illustrates one example of the display screen related to a movable object. As illustrated in FIG. 11A, for example, in the case where the classification result related to a land cover is displayed, the terminal 2 displays the image area corresponding to the land cover designated by the user in a manner different from the other image areas. For example, the terminal 2 highlights the pixels corresponding to the land cover designated by the user by color-coding or the like.

As illustrated in FIG. 11B, for example, in the case where the classification result related to a movable object is displayed, the terminal 2 displays an area in which one or more movable objects are present by a rectangular frame while displaying the number of movable objects within the area in graph form.

Next, the details of the processing at the time of accepting additional purchase of a cell image 51 is described. The terminal 2 accepts additional purchase of some cell images 51 shot at another time point from the display screen shown in FIG. 10. For example, the terminal 2 accepts designation input for designating another time point by the operation menu. If another time point is designated, the terminal 2 accesses the server 1 and requests the server 1 to output the cell images 51 that are related to the satellite image shot at the designated time point and that are in the same area as the cell images 51 that are being displayed. If acquiring the cell images 51 from the server 1, the terminal 2 switches the screen to a preview image of the acquired cell images 51 and displays the switched preview image.

FIG. 12 illustrates one example of the switched screen. Similarly to Embodiment 1, the terminal 2 displays the cell images 51 superimposed on the map image. The terminal 2 accepts setting input of the cloud amount and the off-nadir angle by the cloud amount setting section 52 and the angle setting section 53, respectively, accepts registration operation in a cart on this screen, and then proceeds to purchase application. The cart registration processing, the purchase processing for the cell images 51, etc. are similar to those in the above description, and thus the detailed description is not repeated.

As described above, the user can designate the geographical range (area), the shooting time point, etc. of the cell images 51 to be purchased on the map image with simple operation. Furthermore, cell images 51 (area observation information) of an arbitrary area are cut out and provided from the raw image data acquired from the satellite 3, that is, the satellite image (observation information) having a huge data size. This allows the user to acquire an easy-to-handle image with a small data size. According to the present embodiment, it is possible to easily acquire a satellite image that permits ease in handling.

Additionally, according to the present embodiment, the user can acquire cell images 51 including the classification result of a desired target object. This makes it possible to utilize satellite images for various applications such as grasping of the situation of a land, the traffic volume or the like.

FIG. 13 is a flowchart of one example of the processing procedure of classifier generation processing. The details of the processing of generating the land cover classifier 143 and the object classifier 144 by conducting machine learning are described with reference to FIG. 13.

The control unit 11 of the server 1 acquires training data of a satellite image associated with a correct answer value as a classification result obtained when each target object contained in the satellite image is classified (step S11). As described above, the target object to be classified includes a land cover that covers the surface of the earth, an object (movable object, for example) present on the surface of the earth, etc. The control unit 11 acquires training data of the satellite image labeled with information (correct answer value) of various objects.

The control unit 11 generates the land cover classifier 143 for outputting, when a satellite image is input by using the training data, a classification result obtained by classifying a land cover within the satellite image (step S12). That is, the control unit 11 inputs the satellite image included in the training data to the land cover classifier 143 and acquires the classification result obtained when a land cover is classified as output. The control unit 11 compares the acquired classification result with the correct answer value and optimizes parameters such as weights between the neurons such that the output classification result approximates the correct answer value.

Furthermore, the control unit 11 generates the object classifier 144 for outputting, when a satellite image is input by using the training data, a classification result obtained by classifying an object within the satellite image (step S13). More specifically, the control unit 11 inputs the satellite image included in the training data to the object classifier 144 and acquires an estimation result (classification result) obtained by estimating the number of objects present at each area within the satellite image. The control unit 11 compares the acquired classification result with the correct answer value and optimizes parameters such as weights between the neurons such that the output estimation result approximates the correct answer value. The control unit 11 ends the series of processing.

Figure 14:
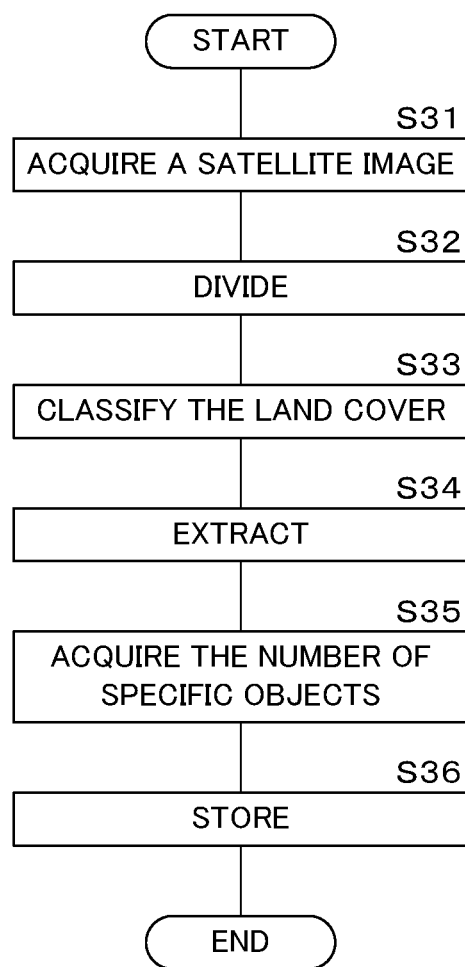
FIG. 14 is a flowchart of one example of the processing procedure of target object classification processing.

FIG. 14 is a flowchart of one example of the processing procedure of target object classification processing. The details of the processing of classifying various objects contained in the satellite image by using the land cover classifier 143 and the object classifier 144 are described.

The control unit 11 of the server 1 acquires a satellite image obtained by the satellite 3 shooting a target region (step S31). The control unit 11 divides the acquired satellite image into cell images 51, 51, 51 . . . corresponding to areas into which the target region is sorted (step S32).

The control unit 11 inputs the cell images 51 to the land cover classifier 143 to classify the land cover within the cell image 51 (step S33). For example, the control unit 11 acquires a classification result indicating the type of the land cover corresponding to each of the pixel values within the cell image 51 from the land cover classifier 143.

The control unit 11 extracts image areas corresponding to various types of the land covers from the cell image 51 according to the classification result acquired at step S33 (step S34). The control unit 11 inputs the extracted image areas to the object classifier 144 to acquire a classification result indicating the number of specific objects contained in the image areas from the object classifier 144 (step S35).

The control unit 11 stores the satellite image acquired at step S31 and the classification results of the object related to each cell image 51 acquired at step S33 and S35 in association with each other in the image DB 142 (step S36). The control unit 11 ends the series of processing.

Figure 15:
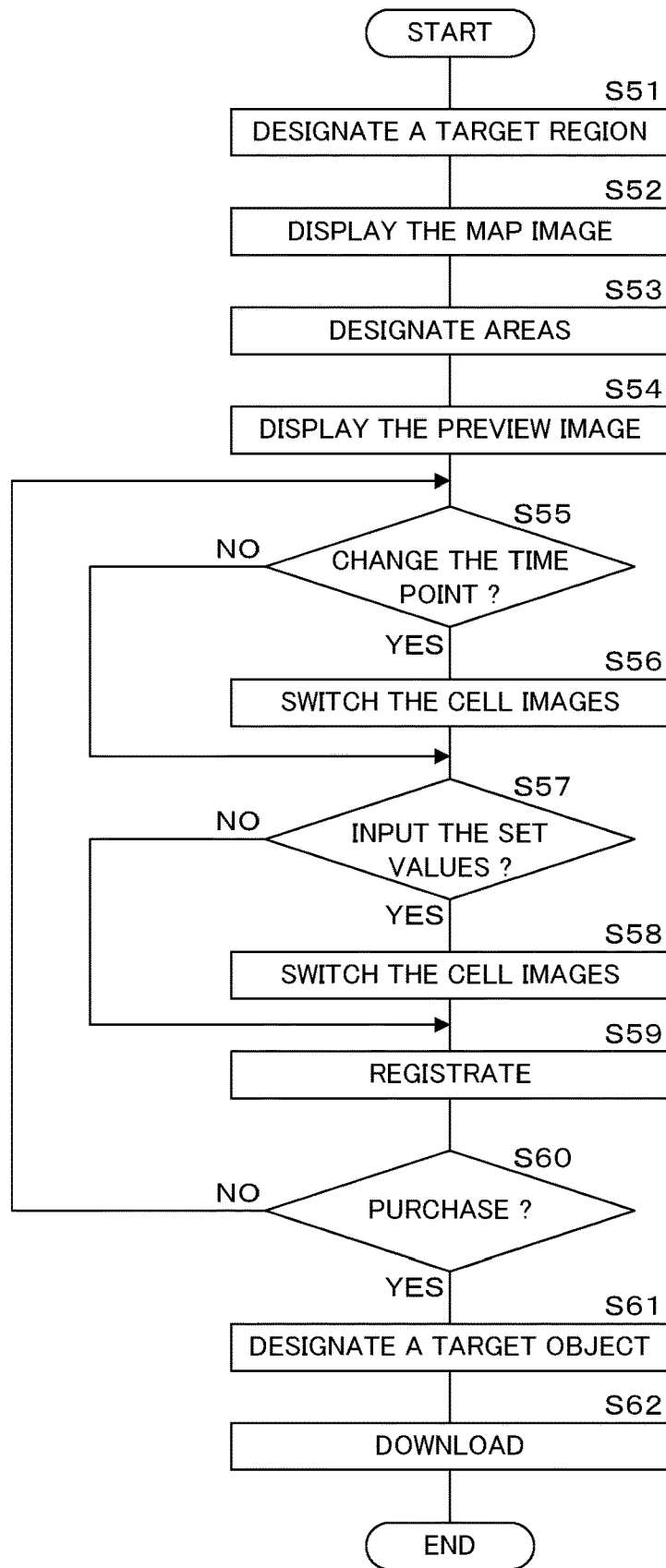
FIG. 15 is a flowchart of one example of the processing procedure of image purchase processing.

FIG. 15 is a flowchart of one example of the processing procedure of image purchase processing. The details of the processing executed by the server 1 is described with reference to FIG. 15.

The control unit 11 of the server 1 accepts designation input for designating a target region representing a map image from the terminal 2 (step S51). The control unit 11 outputs the map image of the designated region to the terminal 2 and causes the terminal 2 to display the map image (step S52). More specifically, as described above, the control unit 11 displays a map image on which the grid 41 (dividing line) for dividing the target region into multiple areas is superimposed.

The control unit 11 accepts designation input for designating multiple areas out of the respective areas on the map image divided by the grid 41 (step S53). The control unit 11 extracts the cell images 51 (area observation information) corresponding to the designated areas from the satellite image (observation information) of the target region, and outputs a preview image on which the extracted cell images 51 are superimposed at the corresponding areas on the map image to the terminal 2 and causes the terminal 2 to display the preview image (step S54). At step S54, the control unit 11 extracts the cell images 51 from the satellite image shot at the latest time point out of the satellite images shot at the target region and superimposes the extracted cell images 51 on the map image.

The control unit 11 determines whether or not designation input for designating change of the shooting time point to another time point is accepted (step S55). If determining that designation input for designating the shooting time point is accepted (S55: YES), the control unit 11 extracts cell images 51 from the satellite image shot at the designated shooting time point, outputs the cell images 51 to the terminal 2 and causes the terminal 2 to switch the cell images 51 on the map image to the acquired cell images (step S56).

After execution of the processing at step S56 or if NO at step S55, the control unit 11 determines whether or not input of set values related to the cloud amount and/or the off-nadir angle for each of the cell images 51 is accepted (step S57). For example, the control unit 11 accepts setting input of the upper limit values for the cloud amount and/or the off-nadir angle. If determining that input of set values of the cloud amount and/or the off-nadir angle is accepted (step S57: YES), the control unit 11 switches the display of the cell images 51 such that a cell image 51 satisfying the set value and a cell image 51 not satisfying the set value are displayed in a different manner (step S58).

After execution of the processing at step S58 or if NO at step S57, the control unit 11 accepts registration operation of registering cell images 51 in the cart (purchase candidate list) from the terminal 2 (step S59). The control unit 11 determines whether or not a purchase request (use request) for the cell images 51 registered in the cart is accepted (step S60). If determining that a purchase request is not accepted (S60: NO), the control unit 11 returns the processing to step S55.

If determining that a purchase request is accepted (step S60:YES), the control unit 11 accepts designation input for designating a target object desired as a target to be classified by the user (step S61). The target object designated at step S61 includes the type of a land cover, the type of an object (movable object) or the like as described above. The control unit 11 outputs to the terminal 2 the cell image 51 to which data indicating the classification result of the target object is added for each of the cell images 51 for which a purchase request is accepted with reference to the image DB 42, and causes the terminal 2 to download the cell image 51 (step S62). The control unit 11 ends the series of processing.

Figure 16:
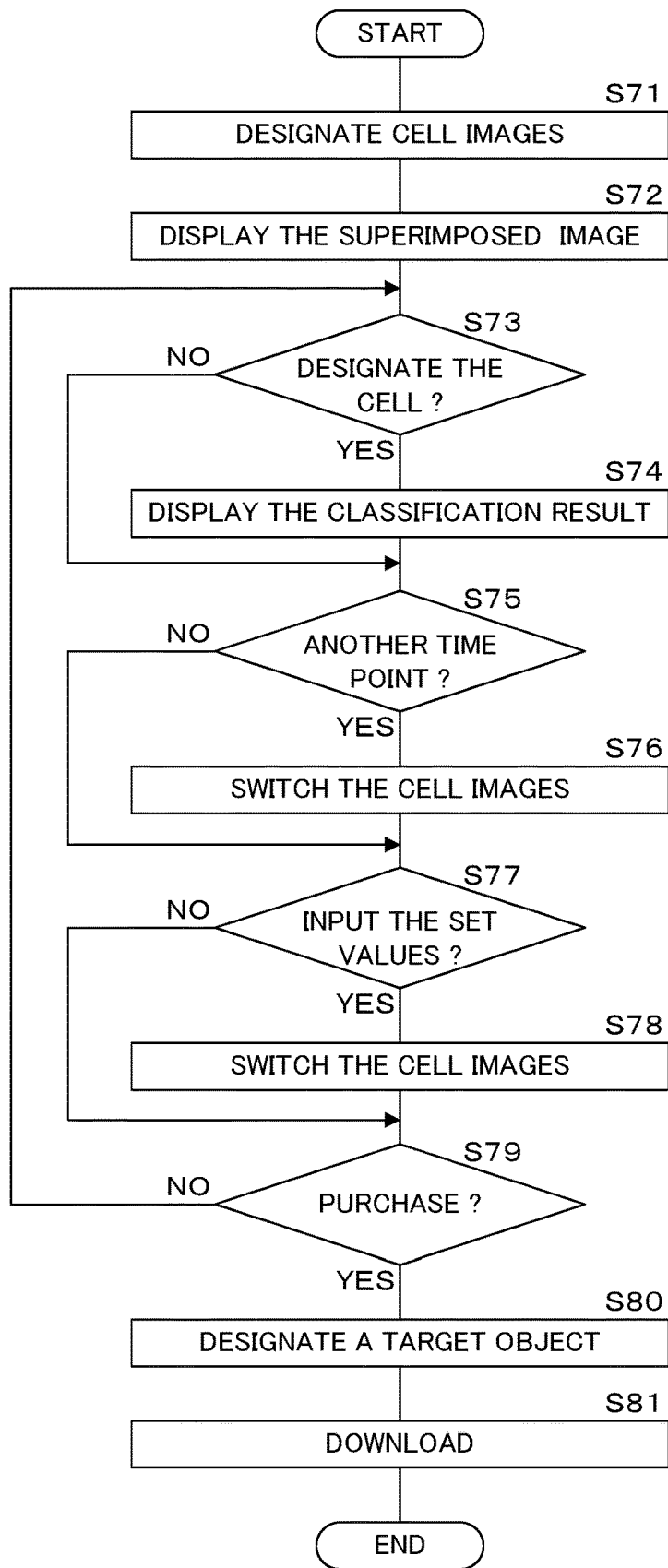
FIG. 16 is a flowchart of one example of the processing procedure of image browsing processing.

FIG. 16 is a flowchart of one example of the processing procedure of image browsing processing. The details of processing performed at the time of browsing the purchased satellite image is described with reference to FIG. 16.

The control unit 11 of the server 1 accepts designation input for designating purchased cell images 51, that is, user available cell images 51 from the terminal 2 (step S71). The control unit 11 generates a map image on which the designated cell images 51 are superimposed at the corresponding locations on the map image and causes the terminal 2 to display the superimposed image (step S72).

The control unit 11 determines whether or not designation input for designating the cell image 51 for which the classification result of the target object is to be displayed is accepted from the terminal 2 (step S73). If determining that the designation input is accepted (S73:YES), the control unit 11 causes the terminal 2 to display the cell image 51 indicating the classification result of the target object contained in the designated cell image 51 and the classification result of the target object designated by the user upon purchasing (step S74). For example, if a land cover is assumed to be a target, the control unit 11 displays the cell image 51 in which the image area (pixels) corresponding to each land cover is displayed in a different manner by color-coding or the like. Alternatively, if the number of objects is assumed to be a target, for example, the control unit 11 displays the cell image 51 in which the number of object present in each image area is shown in a graph form or the like.

After execution of the processing at step S74 or if "NO" at step S73, the control unit 11 determines whether or not designation input for designating switching of the shooting time point of the cell images 51 to another time point is accepted (step S75). If determining that designation input for designating the shooting time point is accepted (S75: YES), the control unit 11 switches the screen to the cell images 51 at the designated time point and displays the switched cell images 51 (step S76). After execution of the processing at step S76 or if "NO" is determined at step S75, the control unit 11 determines whether or not input of set values of the cloud amount and/or the off-nadir angle are accepted (step S77). If determining that input of set values of the cloud amount and/or the off-nadir angle are accepted (step S77: YES), the control unit 11 switches the display of the cell images 51 such that a cell image 51 satisfying the set value and a cell image 51 not satisfying the set value are displayed in a different manner (step S78).

After execution of the processing at step S78 or if "NO" is determined at step S77, the control unit 11 determines whether or not a purchase request for the cell images 51 is accepted from the terminal 2 (step S79). If determining that a purchase request is not accepted (S79: NO), the control unit 11 returns the processing to step S73. If determining that a purchase request is accepted (step S79: YES), the control unit 11 accepts designation input for designating a target object desired by the user as a target to be classified (step S80). The control unit 11 outputs the cell images 51 containing the classification result of the designated target object to the terminal 2, causes the terminal 2 to download the cell images 51 (step S81) and end the series of processing.

Hence, according to Embodiment 1, it is possible to easily acquire easy-to-deal satellite images (observation information).

Furthermore, according to Embodiment 1, a preview of the cell image at the region designated by the user is displayed on the map image. This makes it possible to easily grasp the location of the cell image 51 as a target to be purchased (used).

Moreover, according to Embodiment 1, it is possible to purchase (use) a satellite image at an arbitrary time point from the respective satellite images shot at the past time points stored in the image DB 142.

Additionally, according to Embodiment 1, the purchased cell images 51 can easily be browsed while additional purchase of a cell image 51 can be easily performed.

In addition, according to Embodiment 1, cell images 51 can be narrowed down depending on the cloud amount and/or off-nadir angle, whereby a desired cell image 51 can easily be acquired.

Furthermore, according to Embodiment 1, by using the classifiers constructed by machine learning, a desired target object can be extracted and provided (presented) from the satellite image.

Moreover, according to Embodiment 1, classification of the land cover using the land cover classifier 143 is performed to thereby provide the user with information on the land cover covering the target region.

Additionally, according to Embodiment 1, using the object classifier 144, information on the number of specific objects (movable object, for example) contained in the satellite image can be provided to the user. Especially, in the present embodiment, the image area to be input is narrowed down by using the classification result of the land cover performed by the land cover classifier 143, resulting in reduction in a processing load.

Embodiment 2

In the present embodiment, a mode allowing the user to purchase in bulk satellite images shot during the time period designated by the user is described.

Figure 17:
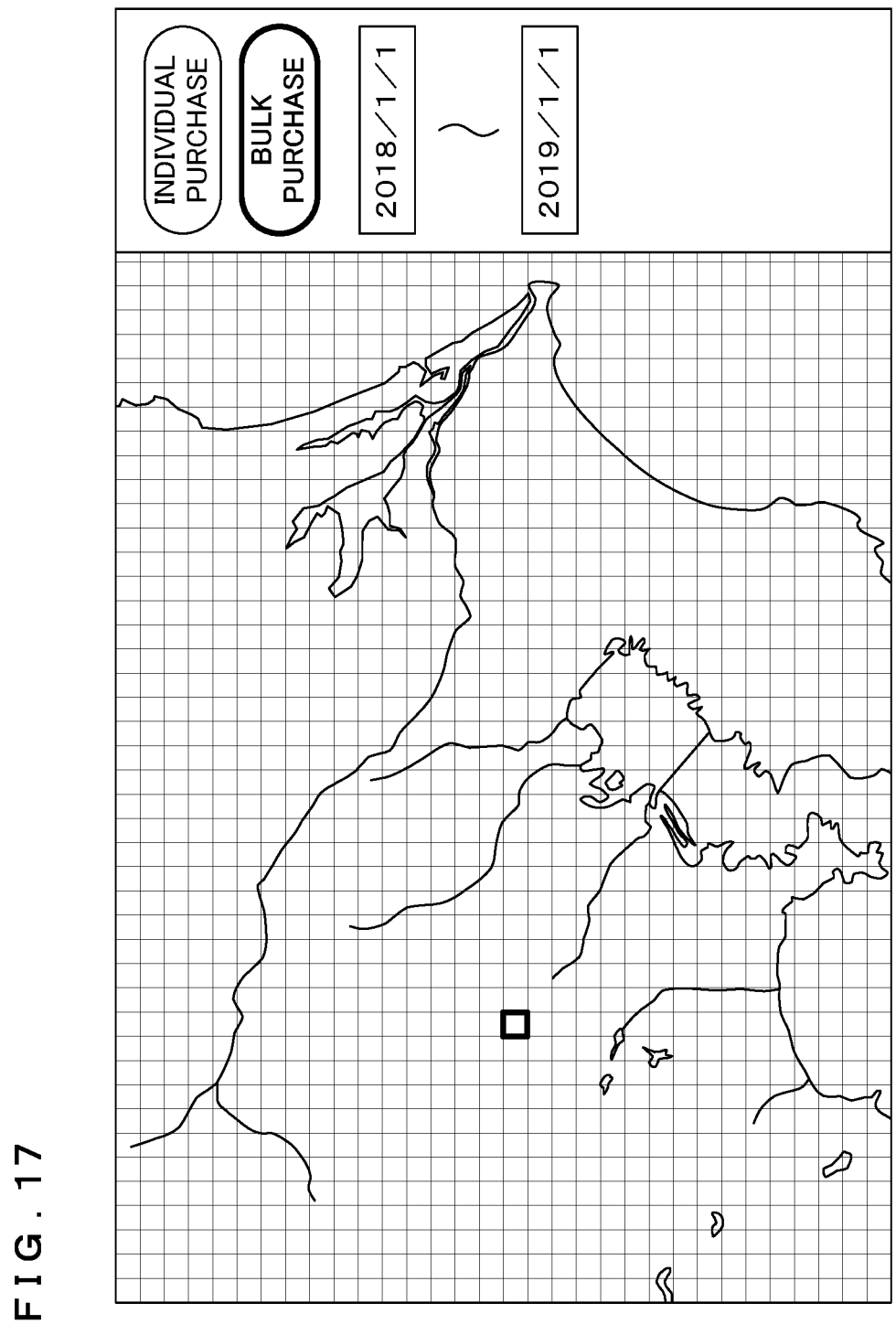
FIG. 17 illustrates one example of a display screen according to Embodiment 2.

FIGS. 17 and 18 each illustrate one example of a display screen according to Embodiment 2. The outline of the present embodiment will be described with reference to FIGS. 17 and 18.

FIG. 17 shows one example of a display screen obtained when the user designates multiple areas to be purchased from the map image. If multiple areas to be purchased are designated, the terminal 2 displays an operation menu at the right of the screen to accept operation input as to whether or not cell images 51 are to be purchased in bulk while the shooting time period is designated, for example. If accepting designation input for designating the shooting time period at the operation menu, the terminal 2 registers in the cart the cell images 51 obtained by extracting the respective image areas corresponding to the designated multiple areas from the respective satellite images shot at multiple shooting time points included in the designated period. Naturally, it may be possible to display a preview image before registration in the cart.

If the cell images 51 related to the respective shooting time points are registered in the cart, the terminal 2 shifts to purchase application in response to operation input by the user and accesses the server 1 to perform purchase processing. In this case, the terminal 2 accepts designation input for designating a target object to be classified and transmits a purchase request for the cell images 51 including the details of the designation to the server 1 similarly to Embodiment 1. If accepting the purchase request from the terminal 2, the server 1 outputs to the terminal 2 an image group (observation information group) that consists of cell images 51, 51, 51 . . . at the time points to each of which a classification result of the designated target object is added and causes the terminal 2 to download the group. According to the processing described above, the user can purchase the cell images 51 shot at arbitrary period of time in bulk by the above-described processing, resulting in improved convenience of the user.

FIG. 18 displays one example of a display screen at the time of displaying the classification result of the target object related to the purchased cell images 51. For example, if accepting designation input of the cell image 51 on the display screen in FIG. similarly to Embodiment 1, the terminal 2 displays the classification result related to the target object of the designated cell image 51. In this case, the terminal 2 displays in time series the image group that includes the designated cell image 51 and consists of multiple cell images 51 obtained by shooting the same region as the designated cell image 51 at different shooting time points. For example, the terminal 2 reproduces video of the respective cell images 51 shot at the multiple shooting time points in time series frame by frame.

The terminal 2 here displays a land cover by color-coding and the number of moving objects in graph form for the cell image 51 shot at each of the time points. Thus, the terminal 2 can display time-series change of the target object such as a land cover, a moving object, etc. As such, the user can grasp the change of the state and situation of the designated target object as well as can purchase the cell images 51 in bulk.

Figure 19:
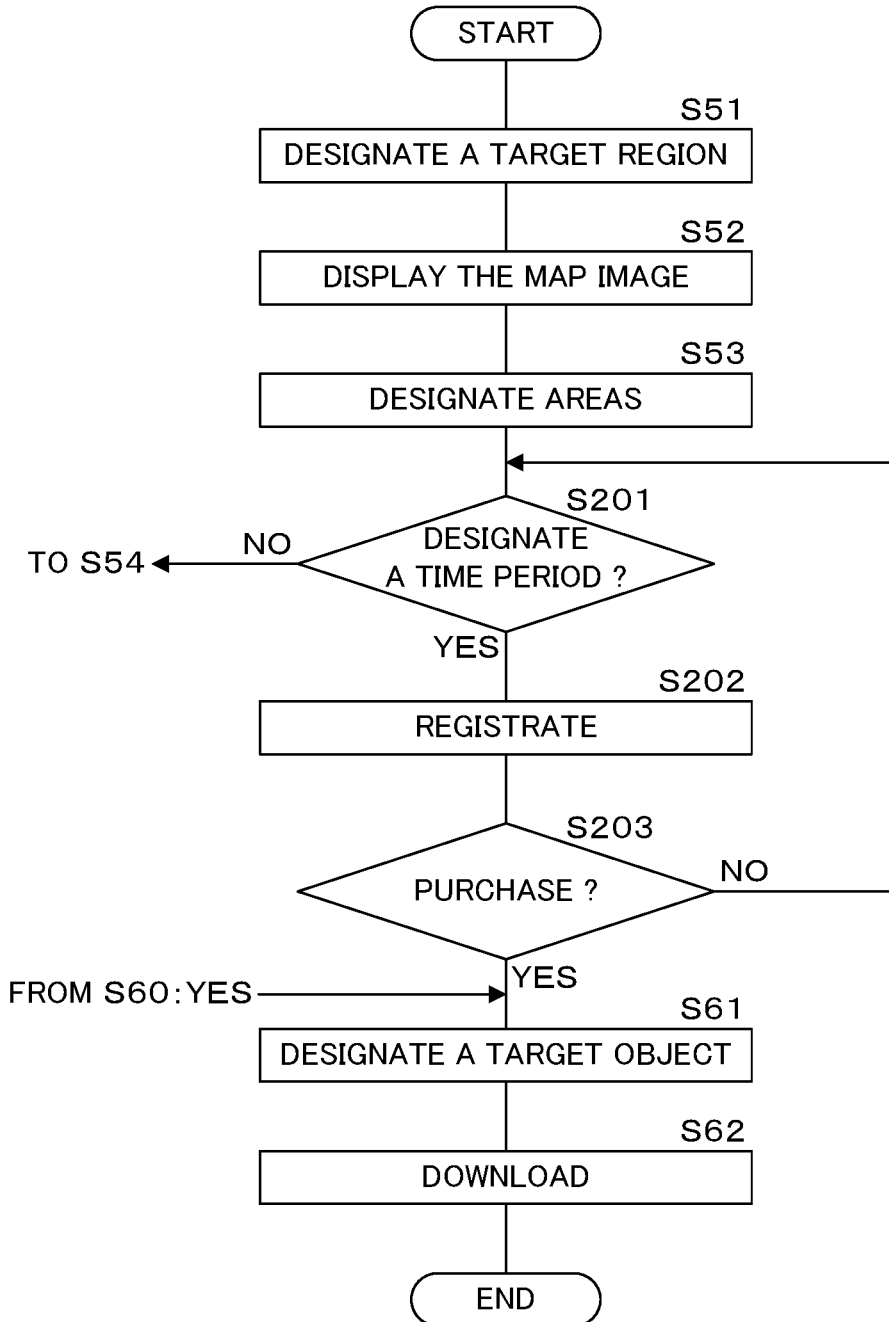
FIG. 19 is a flowchart of one example of the processing procedure of image purchase processing according to Embodiment 2.

FIG. 19 is a flowchart of one example of the processing procedure of image purchase processing according to Embodiment 2.

After accepting designation input for designating multiple areas on the map image (step S53), the control unit 11 of the server 1 executes the following processing. The control unit 11 determines whether or not designation input for designating a shooting time period to be purchased is accepted for the cell images 51 corresponding to the designated areas (step S201). If determining that designation input for a time period is not accepted (S201: NO), the control unit 11 shifts the processing to step S54.

If determining that designation input for a time period is accepted (S201: YES), the control unit 11 registers in the cart of the user the image group that consists of respective cell images 51 shot at multiple time points included in the designated time period and that corresponds to the areas designated at step S53 (step S202). The control unit 11 determines whether or not a purchase request for purchasing the cell images 51 registered in the cart is accepted (step S203). If determining that a purchase request is not accepted (S203: NO), the control unit 11 returns the processing to step S201. If determining that a purchase request is accepted (S203: YES), the control unit 11 shifts the processing to step S60.

Figure 20:
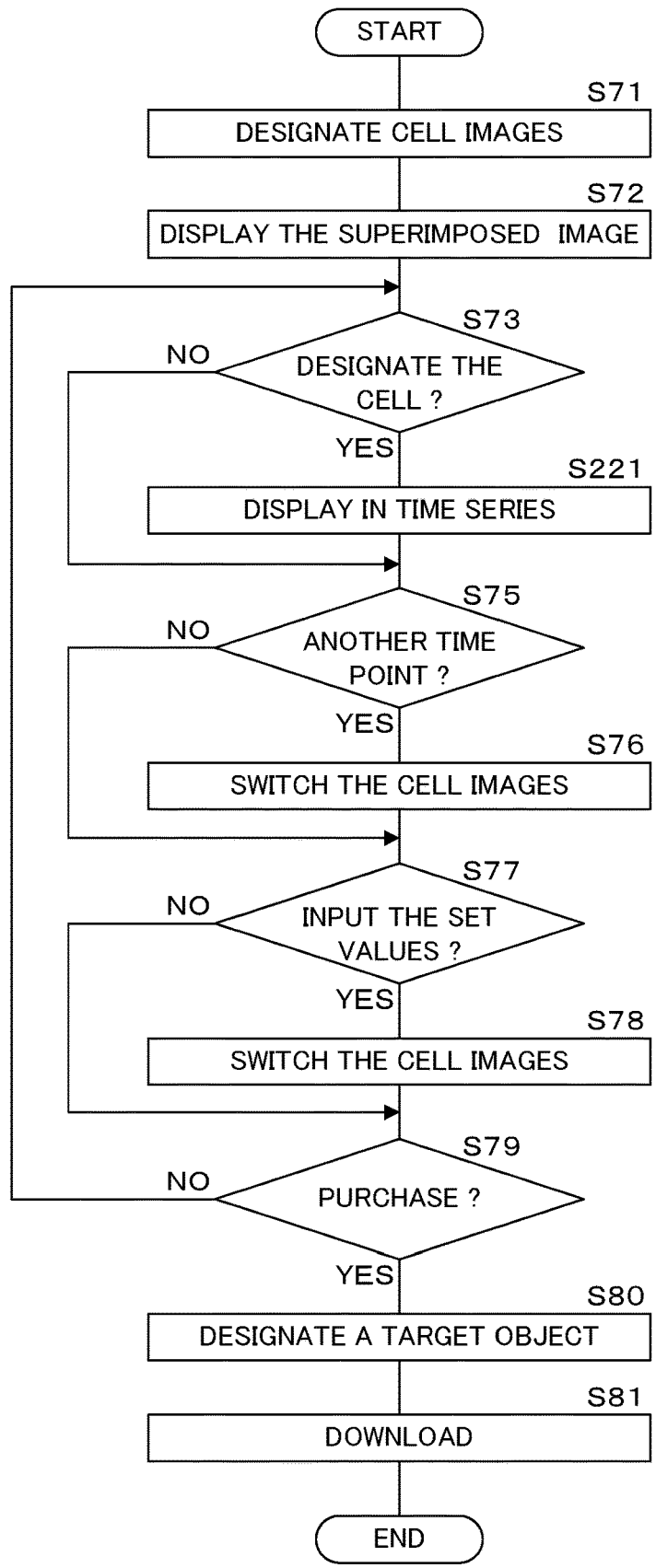
FIG. 20 is a flowchart of one example of the processing procedure of image browsing processing according to Embodiment 2.

FIG. 20 is a flowchart of one example of the processing procedure of image browsing processing according to Embodiment 2.

If determining that designation input for the cell image 51 for which the classification result related to the target object is to be displayed is accepted from the terminal 2 (S73: YES), the control unit 11 of the server 1 executes the following processing. The control unit 11 displays in time series the image group that includes the designated cell image 51 and consists of multiple cell images 51 obtained by shooting the same region as the designated cell image 51 at different shooting time points (step S221). For example, the control unit 11 reproduces video of the cell images 51 as described above. Here, the control unit 11 can display video showing time-series change of the target object by displaying the land cover by color-coding and the number of moving objects in graph form for the cell image 51 shot at each of the shooting time points. The control unit 11 shifts the processing to step S75.

As such, according to Embodiment 2, it is possible to purchase in bulk the cell images 51 shot at multiple shooting time points, resulting in improved convenience of the user.

Moreover, according to Embodiment 2, it becomes possible for the user to grasp the time-series change of a target object by provision of the cell images 51 shot at multiple shooting time points to each of which the classification result of the target object is added.

Embodiment 3

In the present embodiment, a mode allowing the user to search for a desired image from the satellite images stored in the image DB 142 is described.

Figure 21:
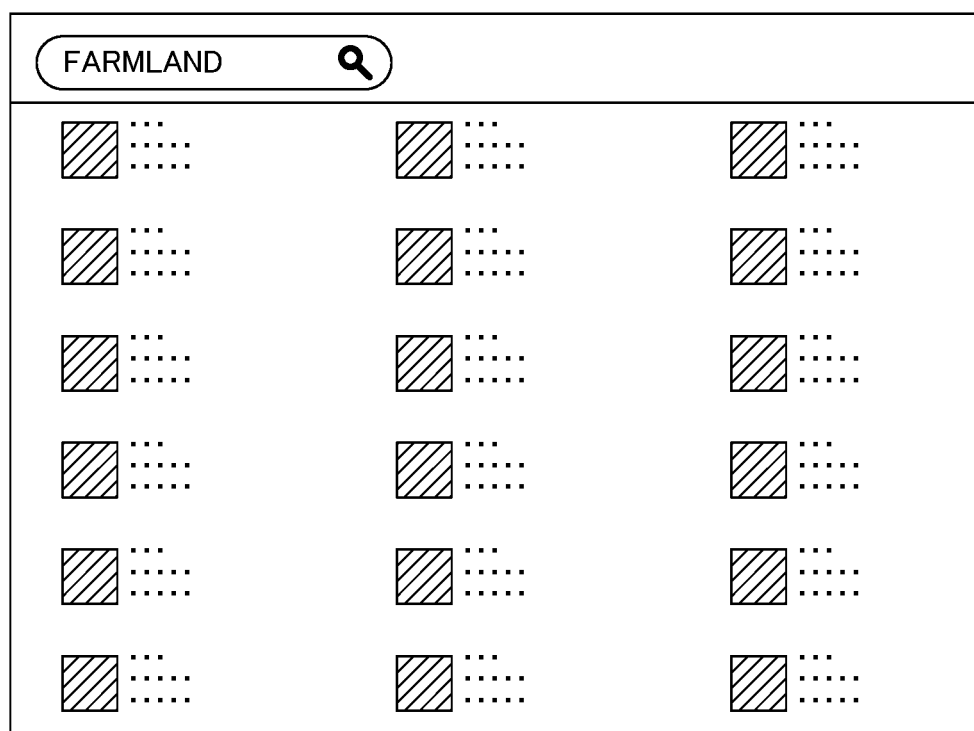
FIG. 21 illustrates the outline of Embodiment 3.

FIG. 21 illustrates the outline of Embodiment 3. As described above, the server 1 stores each of the satellite images acquired from the satellite 3 and classification results obtained by classifying a target object contained in each of the satellite image by the land cover classifier 143 and the movable object classifier in association with the target region and the shooting time point of the satellite image in the image DB 142. In the present embodiment, the user can search the image DB 142 for a desired image while using a target object as a search query. The outline of the present embodiment will be described with reference to FIG. 21.

For example, the terminal 2 accepts designation input for designating the type of a target object (land cover or movable object) as a search query and transmits the search request to the server 1. It is noted that the terminal 2 may issue a search request while designating more detailed search criteria such as the size (area) of a land cover, the threshold for the number of movable objects, etc. concerning the target object.

If accepting the search request from the terminal 2, the server 1 searches the image DB 142 for cell images 51 containing the target object designated by the user with reference to the classification result of the target object associated with each of the satellite images (cell images 51). The server 1 outputs the search result to the terminal 2 and causes the terminal 2 to display the search result. As illustrated in FIG. 21, for example, the server 1 displays the thumbnail images of the searched cell images 51 in list form.

For example, the terminal 2 accepts selection input for selecting any one of the cell images 51 displayed in list form as a search result and displays a preview image showing the selected cell image 51 superimposed on the map image. Here, the terminal 2 may display a preview image of all or a part of the information on the target object as a search query such as a land cover, a movable object, etc. The server 1 accepts registration operation of the cell image 51 in the cart, then accepts a purchase request for the cell image 51 and outputs the cell image 51 including the classification result of the target object to be searched to the terminal 2.

Figure 22:
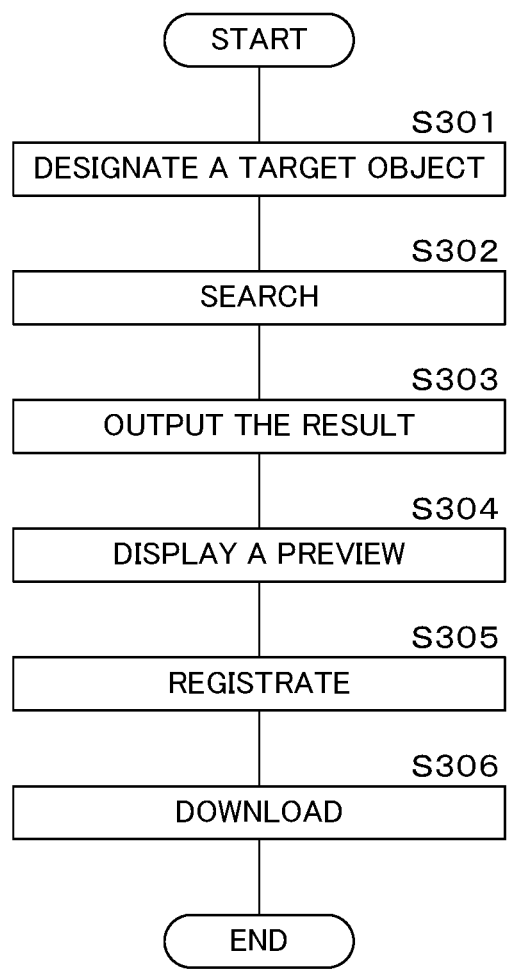
FIG. 22 is a flowchart of one example of the processing procedure executed by a server according to Embodiment 3.

FIG. 22 is a flowchart of one example of a processing procedure executed by a server 1 according to Embodiment 3.

The control unit 11 of the server 1 accepts designation input for designating a target object to be searched (step S301). The control unit 11 searches the image DB 142 for satellite images (cell images 51) including the designated target (step S302). The control unit 11 outputs the search result to the terminal 2 (step S303). For example, the control unit 11 displays the thumbnail images of the searched cell images 51. In this case, the control unit 11 may output all or a part of the information on the target object as a search query for the searched cell images 51 to the terminal 2 and causes the terminal 2 to display it.

The control unit 11 accepts selection input for selecting any one of the cell images 51 displayed as a search result and causes the terminal 2 to display a preview screen showing that the selected cell image 51 is superimposed on the map (step S304). The control unit 11 accepts registration operation of the previewed cell image 51 in the cart (step S305). The control unit 11 accepts a purchase request for the cell image 51 registered in the cart from the terminal 2 to perform purchase processing and causes the terminal 2 to download the cell image 51 (step S306). The control unit 11 ends the series of processing.

As such, according to Embodiment 3, it is possible to search the image DB 142 for a satellite image including the target object designated by the user, resulting in improved convenience of the user.

Embodiment 4

In the present embodiment, a mode is described in which a target object is monitored based on the satellite images to determine whether or not a predetermined change occurs in the target object.

FIG. 23 illustrates the outline of Embodiment 4. In the present embodiment, the server 1 detects a predetermined phenomenon occurring in a target region from the satellite images continuously shot by the satellite 3 based on a time-series change of a classification result of the target object by the land cover classifier 143 or the like and reports the phenomenon to the user. The phenomenon as a target to be monitored is a phenomenon related to a disaster such as a landslide, a volcanic eruption or the like. The present embodiment will be described with reference to FIG. 23.

For example, the terminal 2 first pre-registers a target region to be monitored and a phenomenon to be monitored. For example, the terminal 2 accepts designation input for designating a target region from the user by the user designating the region to be monitored on the map image similarly to FIG. 6. Furthermore, the terminal 2 accepts designation input as to the type of the disastrous phenomenon to be monitored such as a landslide, a volcanic eruption, etc.

The terminal 2 transmits the designated various types of information to the server 1 and pre-registers them.

Every time the server 1 acquires a satellite image obtained by shooting the target region from the satellite 3, it inputs the satellite image to the land cover classifier 143 and obtains the classification result of the land cover. The server 1 here determines whether or not a change of the target object corresponding to the pre-registered phenomenon occurs, comparing the classification result of the land cover classified based on the satellite image previously acquired and the classification result of the land cover classified based on the satellite image currently acquired for the satellite image of the target region. For example, if a landslide is designated as a phenomenon to be monitored, the server 1 determines whether or not "woods" change to "bare ground."

If determining that a change in the target object occurs, the server 1 reports a determination result to the terminal 2. For example, the server 1 reports the terminal 2 that the pre-registered phenomenon occurs at the target region and outputs to the terminal 2 the satellite image representing the target region and labeled with the image area estimated that the phenomenon occurs. Describing with reference to the above-described example, the server 1 outputs to the terminal 2 the satellite image labeled with the area in which "woods" changes to "bare land."

In this case, the server 1 may output a satellite image as a preview display, for example, and may then accept a purchase request for the satellite image from the terminal 2. Alternatively, the server 1 may automatically make a payment for the purchase of the satellite image and cause the terminal 2 to download the satellite image. Hence, if determining that a change in the target object occurs, the server 1 may by hand or automatically execute the purchase processing of the satellite image labeled with the area in which change occurs.

Figure 24:
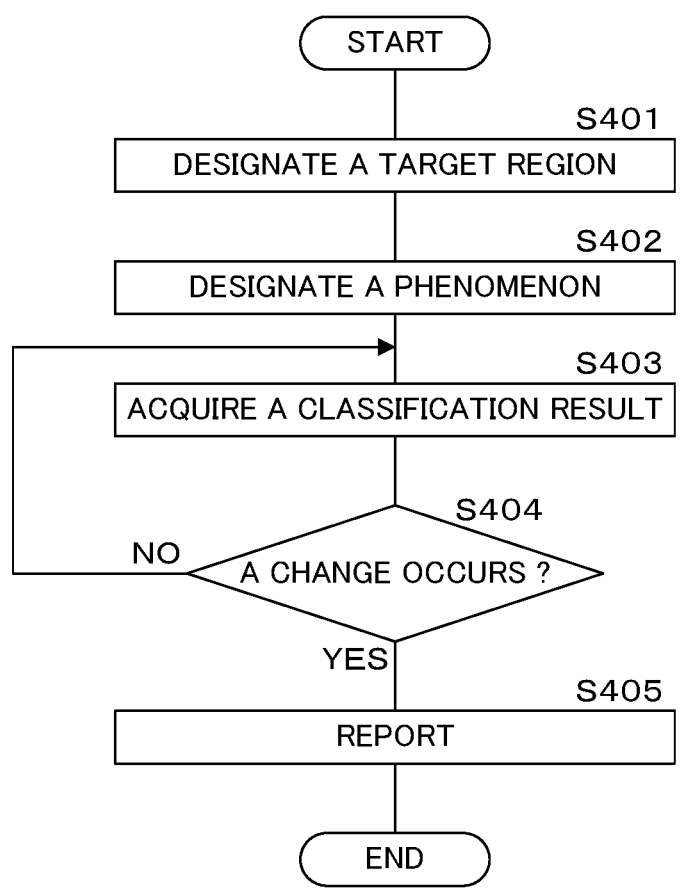
FIG. 24 is a flowchart of one example of the processing procedure executed by a server according to Embodiment 4.

FIG. 24 is a flowchart of one example of the processing procedure executed by the server 1 according to Embodiment 4.

The control unit 11 of the server 1 accepts designation input of designating a target region to be monitored from the terminal 2 (step S401). The control unit 11 further accepts designation input of designating a phenomenon to be monitored (change in the target object) (step S402). The control unit 11 acquires a classification result of the target object obtained by classifying the satellite image corresponding to the target region designated at step 401 from the image DB 142 (step S403). The control unit 11 determines whether or not a change of the target object designated at step S402 occurs as compared with the classification result of the target object shot at the previous shooting time point (step S404).

If determining that no change occurs (S404: NO), the control unit 11 returns the processing to step S403. If determining that a change occurs (404: YES), the control unit 11 reports the determination result to the terminal 2 (step S405) and ends the series of processing.

As such, according to Embodiment 4, it is possible to automatically report a predetermined phenomenon occurring at a target region to the user and to utilize the present system for various applications such as disaster observation, etc.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. An information processing apparatus comprising:
one or more processing devices; and
one or more storage devices storing instructions for causing the one or more processing devices to:
store observation information obtained through observation of a target region on the earth from a flying object moving in outer space into the one or more storage devices;
output to a terminal device a map image corresponding to the target region on which a dividing line for dividing the target region into a plurality of areas is superimposed;
accept designation input for designating multiple ones of the plurality of areas divided by the dividing line from the terminal device;
extract area observation information being a part of the observation information and corresponding to each of the multiple ones of the plurality of areas designated; and
output to the terminal device the area observation information extracted.

2. The information processing apparatus according to claim 1, wherein the instructions further cause the one or more processing devices to:
output to the terminal device a preview image in which the area observation information is superimposed on each of the multiple ones of the plurality of areas on the map image if designation input for designating the multiple ones of the plurality of areas is accepted,
accept a use request for using the area observation information superimposed on the map image from the terminal device, and
output the area observation information in such a manner as to be available to a user of the terminal device if the use request is accepted.

3. The information processing apparatus according to claim 2, wherein the instructions further cause the one or more processing devices to:
store a plurality of pieces of the observation information obtained by observing the target region at a plurality of observation time points into the one or more storage devices,
accept designation input for designating the observation time point, and
extract the area observation information corresponding to the multiple ones of the plurality of areas from the observation information corresponding to the observation time point designated.

4. The information processing apparatus according to claim 3, wherein the instructions further cause the one or more processing devices to:
output the map image on which the area observation information that is available to the user is superimposed in response to a request from the terminal device,
accept designation input for changing the observation time point corresponding to the available area observation information to another observation time point,
extract the area observation information related to areas corresponding to the available area observation information from the observation information corresponding to said another observation time point designated,
output to the terminal device a preview image in which the area observation information extracted is superimposed on a corresponding area of the map image, and
accept a use request for the area observation information at said another observation time point from the terminal device.

5. The information processing apparatus according to claim 3, wherein the instructions further cause the one or more processing devices to:
accept designation input for designating a time period including a plurality of the observation time points from the terminal device,
extract the area observation information from each of the plurality of pieces of the observation information corresponding to each of the plurality of the observation time points included in a time period designated, and
output the area observation information at each of the plurality of the observation time points to the terminal device.

6. The information processing apparatus according to claim 2, wherein the instructions further cause the one or more processing devices to:
accept a set value for a cloud amount at each of the multiple ones of the plurality of areas at a time of observing the observation information or a set value related to an angle formed by a normal extending from a surface of the earth to the flying object at the time of observation and a straight line connecting the flying object and each of the multiple ones of the plurality of areas, and
output the preview image in which the area observation information of an area satisfying the set value and the area observation information of an area not satisfying the set value are displayed in a different manner.

7. An information processing method causing a computer to execute processing of:
acquiring observation information obtained through observation of a target region on the earth from a flying object moving in outer space;
outputting to a terminal device a map image corresponding to the target region on which a dividing line for dividing the target region into a plurality of areas is superimposed;
accepting designation input for designating multiple ones of the plurality of areas divided by the dividing line from the terminal device;
extracting area observation information being a part of the observation information and corresponding to each of the multiple ones of the plurality of areas designated; and
outputting to the terminal device the area observation information extracted.

8. A non-transitory computer-readable storage medium storing a program that causes a computer to execute processing of:
displaying on a display unit a map image corresponding to a target region observed by a flying object moving in outer space, the map image including a dividing line for dividing the target region into a plurality of areas that is superimposed on the map image;
accepting designation input for designating multiple ones of the plurality of areas divided by the dividing line from a user;
acquiring area observation information, that is a part of observation information obtained by the flying object observing the target region and corresponds to each of the multiple ones of the plurality of areas designated, from a management device for managing the observation information;

switching the map image and displaying a switched map image on which the area observation information is superimposed to each of the multiple ones of the plurality of areas; and outputting to the management device a use request for the area observation information superimposed on the switched map image in response to operation input from the user.

\* \* \* \* \*